(12) United States Patent
Tagami

(10) Patent No.: US 8,948,948 B2
(45) Date of Patent: *Feb. 3, 2015

(54) GENERATION CONTROL APPARATUS AND GENERATION CONTROL METHOD

(75) Inventor: Hiroshi Tagami, Wako (JP)

(73) Assignee: Honda Motor Co., Ltd, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/976,866

(22) PCT Filed: Dec. 12, 2011

(86) PCT No.: PCT/JP2011/078690
§ 371 (c)(1),
(2), (4) Date: Jun. 27, 2013

(87) PCT Pub. No.: WO2012/090689
PCT Pub. Date: Jul. 5, 2012

(65) Prior Publication Data
US 2013/0274982 A1    Oct. 17, 2013

(30) Foreign Application Priority Data

Dec. 27, 2010 (JP) .................................. 2010-290699

(51) Int. Cl.
*B60W 20/00* (2006.01)
*B60L 11/18* (2006.01)
(Continued)

(52) U.S. Cl.
CPC .............. *B60W 10/06* (2013.01); *B60K 6/442* (2013.01); *B60K 6/46* (2013.01); *B60L 11/123* (2013.01);
(Continued)

(58) Field of Classification Search
CPC ................... B60L 11/1862; Y02T 10/7044

USPC ............................................................ 701/22
See application file for complete search history.

(56) References Cited

U.S. PATENT DOCUMENTS

| 5,550,445 A | 8/1996 | Nii |
| 5,778,997 A * | 7/1998 | Setaka et al. .............. 180/65.245 |

(Continued)

FOREIGN PATENT DOCUMENTS

| EP | 2193969 A1 * | 6/2010 | ............... B60K 6/46 |
| JP | 06197406 A * | 7/1994 | .............. B60L 11/08 |

(Continued)

OTHER PUBLICATIONS

JPO machine translation of JP 2000-152420 (original JP document published May 30, 2000).*

(Continued)

*Primary Examiner* — Behrang Badii
*Assistant Examiner* — David Testardi
(74) *Attorney, Agent, or Firm* — Westerman, Hattori, Daniels & Adrian, LLP

(57) ABSTRACT

There is provided a generation control apparatus for a hybrid vehicle having a second generation mode which controls a generation unit so as to suppress the reduction of a state of charge of a battery, wherein the generation control apparatus activates the generation unit with a high load state in which an electric power that is consumed in the hybrid vehicle over a predetermined period of time becomes larger than a maximum output electric power of the generation unit, while controlling the generation unit to operate in the second generation mode unless the battery reaches the target state of charge and thereafter continues to drive the generation unit until the state of charge of the battery reaches a target state of charge of the battery, when the electric power over the predetermined period of time becomes smaller than the maximum output electric power.

13 Claims, 23 Drawing Sheets

(51) Int. Cl.
*B60W 10/06* (2006.01)
*B60K 6/442* (2007.10)
*B60K 6/46* (2007.10)
*B60L 11/12* (2006.01)
*B60W 10/08* (2006.01)
*B60W 10/26* (2006.01)
*H02J 7/14* (2006.01)

(52) U.S. Cl.
CPC ............ *B60L 11/1862* (2013.01); *B60W 10/08* (2013.01); *B60W 10/26* (2013.01); *B60W 20/00* (2013.01); *H02J 7/1446* (2013.01); *B60W 2710/244* (2013.01); *Y02T 10/6217* (2013.01); *Y02T 10/6234* (2013.01); *Y02T 10/7077* (2013.01); *Y02T 10/7044* (2013.01); *Y02T 10/7005* (2013.01); *Y02T 10/705* (2013.01); *Y02T 10/7022* (2013.01); *B60W 2600/00* (2013.01); *Y10S 903/93* (2013.01); *Y02T 10/6286* (2013.01)
USPC ............................................ 701/22; 903/930

(56) References Cited

U.S. PATENT DOCUMENTS

| | | | | |
|---|---|---|---|---|
| 6,166,449 | A * | 12/2000 | Takaoka et al. | 290/40 B |
| 6,344,732 | B2 * | 2/2002 | Suzuki | 320/132 |
| 6,429,613 | B2 * | 8/2002 | Yanase et al. | 318/139 |
| 6,480,767 | B2 * | 11/2002 | Yamaguchi et al. | 701/22 |
| 7,345,452 | B2 * | 3/2008 | Koo | 320/132 |
| 7,463,958 | B2 * | 12/2008 | Suzuki | 701/22 |
| 7,684,906 | B2 * | 3/2010 | Egoshi | 701/22 |
| 8,392,043 | B2 * | 3/2013 | Koprubasi | 701/22 |
| 8,527,122 | B2 * | 9/2013 | Yamada et al. | 701/22 |
| 2001/0020833 | A1 | 9/2001 | Yanase et al. | |
| 2013/0293007 | A1 * | 11/2013 | Tagami | 307/10.1 |

FOREIGN PATENT DOCUMENTS

| | | | | |
|---|---|---|---|---|
| JP | 07-095703 | A | 4/1995 | |
| JP | 2000152420 | A * | 5/2000 | ............ B60L 11/18 |
| JP | 2001-238304 | A | 8/2001 | |
| JP | 2004186087 | A * | 7/2004 | ............ H01M 10/44 |
| JP | 2004229354 | A * | 8/2004 | ............ B60L 11/14 |
| JP | 2005-295617 | A | 10/2005 | |
| JP | 2008-055997 | A | 3/2008 | |
| JP | 2008279803 | A * | 11/2008 | |
| JP | 2010-143310 | A | 7/2010 | |

OTHER PUBLICATIONS

JPO machine translation of JP 2005-295617 (original JP document published Oct. 20, 2005).*
International Search Report for PCT/JP2011/078690, mailing date of Mar. 6, 2012.
International Search Report of PCT/JP2011/078688, mailing date of Feb. 21, 2012.
Written Opinion of PCT/JP2011/078688, mailing date of Feb. 21, 2012, (PCT/ISA/237, in Japanese).
Japanese Office Action dated Jun. 3, 2014, issued in corresponding Japanese Patent Application No. 2012-522863 (4 pages), (in Japanese).

* cited by examiner

GENERATION CONTROL APPARATUS AND GENERATION CONTROL METHOD

TECHNICAL FIELD

The present invention relates to a generation control apparatus for a hybrid vehicle and a generation control method.

BACKGROUND ART

A hybrid vehicle described in Patent Document 1 includes an engine which drives a generator and a drive motor which drives driving wheels and includes a drive battery that stores electric power from the generator and which supplies the electric power to the drive motor. FIG. 22 shows diagrams showing variations of various data in a process before electric power is started to be generated in the hybrid vehicle described in Patent Document 1. A drive system control unit provided in the hybrid vehicle described in Patent Document 1 calculates a charged/discharged power Wbat of the drive battery based on a current Ibat and a voltage Vbat of the drive battery and calculates an accumulated power value Ebat in which the charged/discharged power Wbat is accumulated. Following this, the drive system control unit calculates an accumulated value variation rate DEbat which is a variation rate of the accumulated power value Ebat for each calculation cycle Tpre and thereafter sets a generation threshold Gsoc based on the accumulated value variation rate DEbat. As shown in FIG. 22, the generation threshold Gsoc increases as the accumulated value variation rate DEbat increases.

When it determines that the generation threshold Gsoc which is reset for each calculation cycle Tpre is below a state of charge SOC, the drive system control unit starts generation by the generator. As a result, not only can the exhaustion of electric power in the drive battery be avoided, but also the generation cycle of the generator can be set long. The timing at which the generation is stopped occurs only when the state of charge SOC reaches a predetermined upper limit level.

Patent Document 2 discloses a generation control apparatus for a hybrid electric vehicle which can generate a sufficient amount of electric power in a good response to a request for high output made to a motor. FIG. 23 is a time chart which shows one example of a control result of a generation control by the generation control apparatus described in Patent Document 2. The generation control apparatus starts a normal output generation (P(G)=P1) by a generator when a charged level SOC of a battery is equal to or smaller than a generation start value SOCsta and continues this normal output generation until the charged level reaches a generation end value SOCend. As this occurs, when a required consumed electric power Pm of a drive motor which is detected by a required consumed electric power detection device is equal to or larger than a set value Ph, a high output generation (P(G)=P2) which generates a higher output than the output generated by the normal output generation is executed in place of the normal output generation.

RELATED ART DOCUMENT

Patent Document

Patent Document 1: JP-A-2005-295617
Patent Document 2: JP-A-2001-238304

SUMMARY OF THE INVENTION

Problems to be Solved by the Invention

In Patent Document 1, a condition to stop the generation after the drive system control unit starts the generation is that the state of charge SOC reaches the upper limit level. In addition, in Patent Document 2, too, once the generation is started, the generation is continued until the charged level of the battery reaches the generation end value SOCend. When the state continues after the start of the generation in which the output that is required of the drive motor is low, the state of charge SOC (the charged level) of the drive battery does not have to be kept high. However, according to the patent documents, the drive battery is charged to the upper limit level (the generation end value SOCend). The charging more than required in this way involves the fuel consumption for driving the generator and brings about an increase in $CO_2$ discharge. Consequently, a target value (a target charged level) for the state of charge SOC of the drive battery is desirably set according to an output required of the drive motor (a required output). Namely, in the event that the target charged level is designed so that a high target charged level is set when the required output is high, whereas when the required output is low, a low target charged level is set, the drive battery is prevented from being charged to a level which is higher than a necessary charged level when the required output is low. As a result, the $CO_2$ discharge can be reduced.

However, the output required of the drive motor varies momentarily while the vehicle is being driven. For example, there occurs a situation in which the required output is changed from the low state to the high state and the high required output continues. In particular, when the drive motor requires such a high output that not only electric power supplied from the drive battery but also electric power generated by the generator are made use of to output the required level, the state of charge SOC of the drive battery comes to be reduced. As this occurs, when the state of charge SOC of the drive battery is not high sufficiently, there occurs a situation in which the drive battery cannot continue to output at the required level. Consequently, the drive battery needs to be maintained in an appropriate state of charge.

An object of the invention is to provide a generation control apparatus and a generation control method which can hold a battery in an appropriate state of charge by generated electric power while suppressing the discharge of $CO_2$ which is associated with the generation of electric power.

Means for Solving the Problems

With a view to attaining the object by solving the problem, there is provided a generation control apparatus for a hybrid vehicle including a rechargeable battery which supplies electric power to an electric motor which is a drive source of the hybrid vehicle and a generation unit having an internal combustion engine and a generator which generates electric power by operation of the internal combustion engine and adapted to supply generated electric power to the electric motor or the battery, characterized by including a second generation mode which controls the generation unit so as to suppress the reduction of a state of charge of the battery and characterized in that the generation control apparatus activates the generation unit with a high load state in which an electric power that is consumed in the hybrid vehicle over a predetermined period of time becomes larger than a maximum output electric power of the generation unit, while controlling the generation unit to operate in the second generation mode unless the battery has reached the target state of charge and thereafter continues to drive the generation unit until the state of charge of the battery reaches a target state of charge of the battery which is set at the high load state, when the electric power that is consumed in the hybrid vehicle over the predetermined period of time becomes smaller than the maximum output electric power of the generation unit.

Further, there is provided a generation control method for a hybrid vehicle including a rechargeable battery for supplying electric power to an electric motor which is a drive source of the hybrid vehicle, and a generation unit having an internal combustion engine and a generator which generates electric power by operation of the internal combustion engine and adapted to supply generated electric power to the electric motor or the battery, characterized by including activating the generation unit with a high load state in which an electric power that is consumed in the hybrid vehicle over a predetermined period of time becomes larger than a maximum output electric power of the generation unit and thereafter, driving continuously the generation unit until a state of charge of the battery reaches a target state of charge of the battery which is set at the high load state, and controlling the operation of the generation unit based on a second generation mode for suppressing the reduction of the state of charge of the battery in the event that the battery has not yet reached the target state of charge and controlling the operation of the generation unit based on a first generation mode for holding the state of charge of the battery after the battery has reached the target state of charge.

Further, there is provided a generation control method for a hybrid vehicle including a rechargeable battery for supplying electric power to an electric motor which is a drive source of the hybrid vehicle, and a generation unit having an internal combustion engine and a generator which generates electric power by operation of the internal combustion engine and adapted to supply generated electric power to the electric motor or the battery, characterized by including determining whether or not an electric power that is consumed in the hybrid vehicle over a predetermined period of time belongs to a high load zone which is equal to or larger than a threshold, setting different target states of charge for the battery according to the result of the determination of whether or not the consumed electric power over the predetermined period of time belongs to the high load zone, controlling the operation of the generation unit so that the battery reaches the target state of charge by charging the battery using electric power from the generation unit, counting a time that has elapsed from a point in time when the consumed electric power over the predetermined period of time departed from the high load zone, setting a continuation flag to indicate that the determination continues to be held that the consumed electric power over the predetermined period of time belongs to the high load zone in the event that the battery has not yet reached the target state of charge even after the consumed electric power over the predetermined period of time has departed from the high load zone and the counting of the predetermined period of time has been finished, when the continuation flag indicates that the determination continues to be held that the consumed electric power over the predetermined period of time belongs to the high load zone, holding the state of the continuation flag until the state of charge of the battery reaches the target state of charge which is set when it is determined that the consumed electric power over the predetermined period of time belongs to the high load zone, and when it is determined that the consumed electric power over the predetermined period of time belongs to the high load zone, controlling the operation of the generation unit based on a second generation mode for suppressing the reduction of the state of charge of the battery in the event that the battery has not yet reached the target state of charge, and controlling the operation of the generation unit based on a first generation mode for holding the state of charge of the battery after the battery has reached the target state of charge.

Advantage of the Invention

According to the generation control apparatus according to the inventions and the generation control method according to the inventions, the battery can be held in the proper state of charge by the generated electric power while suppressing the $CO_2$ discharge which is associated with generation of electric power.

MODES FOR CARRYING OUT THE INVENTION

Hereinafter, embodiments of the invention will be described by reference to the drawings.

An HEV (Hybrid Electric Vehicle) includes an electric motor and an internal combustion engine and is driven by driving force of the electric motor and/or the internal combustion engine according to the driving conditions of the vehicle. Briefly speaking, there are two types of HEVs, that is, a series HEV and a parallel HEV. The series HEV is driven by power of the electric motor. The internal combustion engine is used only for generation of electric power. Electric power generated by a generator using power of the internal combustion engine is stored in a battery or is supplied to the electric motor.

The series HEV executes an "EV driving" or a "series driving." In the EV driving, the HEV is driven by driving force of the electric motor. As this occurs, the internal combustion engine is not driven. Additionally, in the series driving, the HEV is driven by driving force of the electric motor which is driven by electric power that is supplied both from the battery and the generator or electric power that is supplied only from the electric motor. As this occurs, the internal combustion engine is driven to generate electric power in the generator.

The parallel HEV is driven by power from either or both of the electric motor and the internal combustion engine. A series/parallel HEV is also known in which both the parallel and series systems are combined. In this series/parallel system, the driving force transmission system is switched to either of the series system and the parallel system by disengaging or engaging (disengaging/engaging) a clutch according to the driving conditions of the vehicle. When the vehicle is driven particularly at low speeds, the clutch is disengaged to drive the vehicle based on the series system, while when the vehicle is driven particularly at middle or high speeds, the clutch is engaged to drive the vehicle based on the parallel system.

(First Embodiment)

Figure 1:
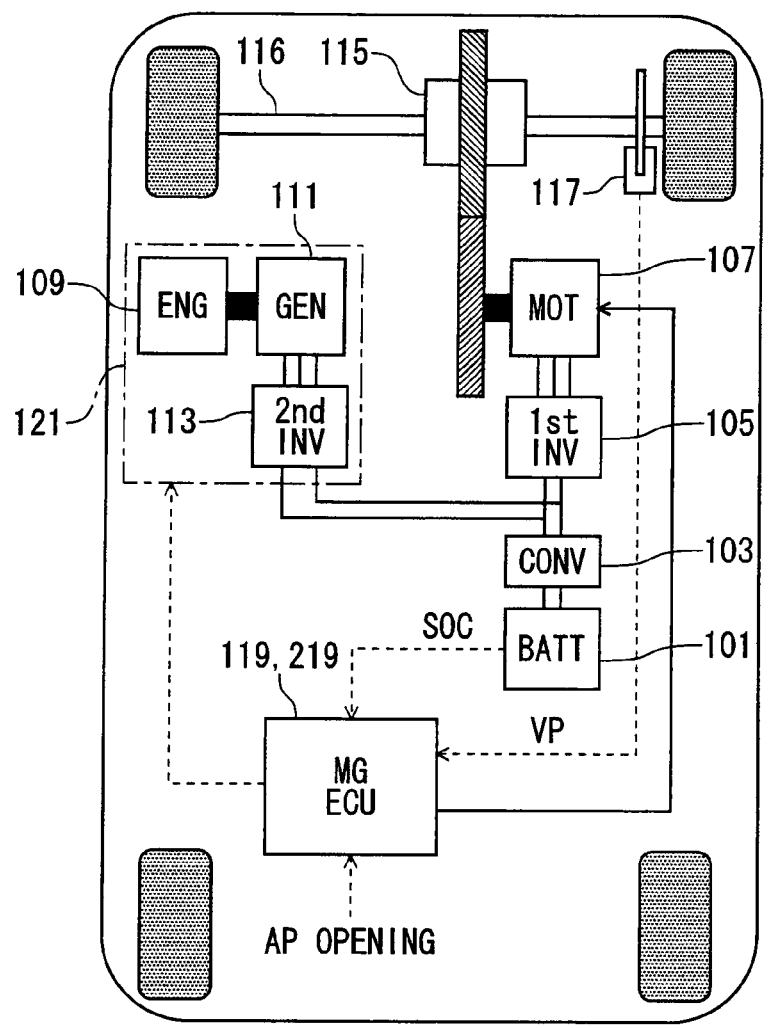
FIG. 1 is a block diagram showing an internal configuration of a series HEV.

FIG. 1 is a block diagram showing an internal configuration of a series HEV. As shown in FIG. 1, the series HEV (hereinafter, referred to simply as a "vehicle") includes a battery (BATT) 101, a converter (CONV) 103, a first inverter ($1^{st}$ INV) 105, an electric motor (Mot) 107, an internal combustion engine (ENG) 109, a generator (GEN) 111, a second inverter ($2^{nd}$ INV) 113, a gearbox (hereinafter, referred to simply as a "gear") 115, a vehicle speed sensor 117, and a management ECU 119. Additionally, in the figure, dotted arrows shown in FIG. 1 denote value data, while a solid arrow denotes a control signal which contains an instruction. In the following description, the internal combustion engine 109, the generator 111 and the second inverter 113 are called an "auxiliary power unit or APU 121" in whole.

The battery 101 has a plurality of battery cells which are connected in series and supplies a high voltage of 100 to 200V, for example. The battery cells are, for example, lithium ion batteries or nickel-metal hydride batteries. The converter 103 raises or drops a direct current output voltage of the battery 101 without converting it to an alternating current voltage. The first inverter 105 converts a direct current voltage to an alternating current voltage and supplies a three-phase current to the electric motor 107. Additionally, the first inverter 105 converts an alternating current voltage that is inputted while the electric motor 107 is executing a regenerative operation to a direct current voltage for storage in the battery 101.

The electric motor 107 generates electric power by which the vehicle is driven. Torque generated in the electric motor 107 is transmitted to a drive shaft 116 via the gear 115. Additionally, a rotor of the electric motor 107 is connected directly to the gear 115. In addition, the electric motor 107 acts as a generator when a regenerative braking is applied in the electric motor 107, and electric power generated in the electric motor 107 is stored in the battery 101. The internal combustion engine 109 is used to drive the generator 111 when the vehicle is driven in a series driving. The internal combustion engine 109 is connected directly to a rotor of the generator 111.

The generator 111 is driven by power of the internal combustion engine 109 to thereby generate electric power. Electric power generated by the generator 111 is stored in the battery 101 or is supplied to the electric motor 107. The second inverter 113 converts an alternating current voltage generated by the generator 111 to a direct current voltage. Electric power converted by the second inverter 113 is charged in the battery 101 or is supplied to the electric motor 107 by way of the first inverter 105.

The gear 115 is a one-speed fixed gear which corresponds to a fifth speed gear, for example. Consequently, the gear 115 converts a driving force from the electric motor 107 to a revolution speed and torque at a specific gear ratio for transmission to the drive shaft 116. The vehicle speed sensor 117 detects a driving speed (a vehicle speed VP) of the vehicle. A signal which signals a vehicle speed VP detected by the vehicle speed sensor 117 is sent to the management ECU 119.

The management ECU 119 obtains a state of charge (SOC) which indicates a state of the battery 101, calculates a required output based on an accelerator pedal opening (AP opening) which corresponds to an accelerator pedal operation by the driver of the vehicle and the vehicle speed VP, and controls the electric motor 107 and the APU 121. The management ECU 119 will be described in detail later.

Figure 2:
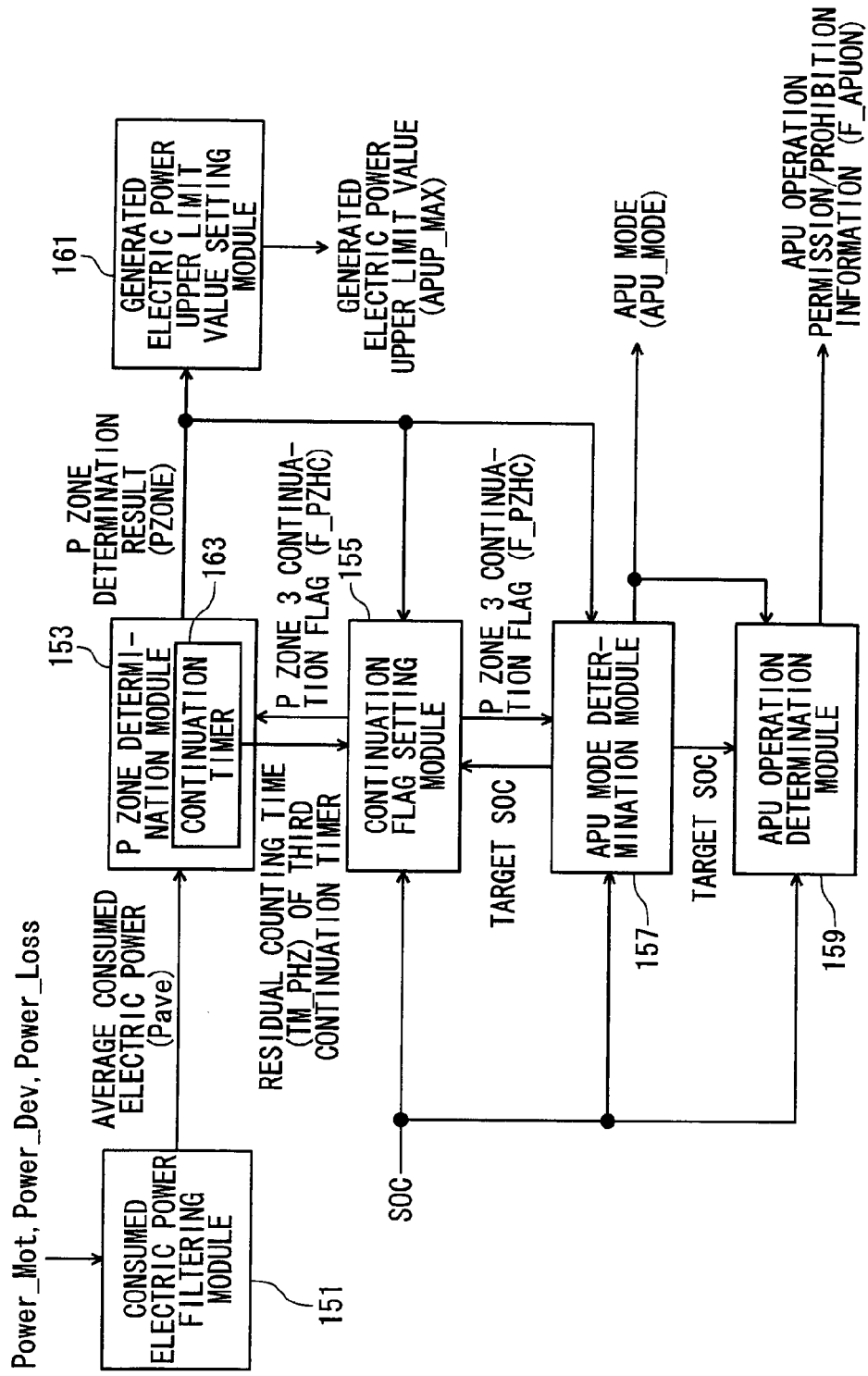
FIG. 2 is a block diagram showing an internal configuration of a management ECU 119 of a first embodiment.

FIG. 2 is a block diagram showing an internal configuration of the management ECU 119 of the first embodiment. As shown in FIG. 2, the management ECU 119 has a consumed electric power filtering module 151, a P zone determination module 153, a continuation flag setting module 155, an APU mode determination module 157, an APU operation determination module 159, and a generated electric power upper limit value setting module 161. Additionally, the P zone determination module 153 has a continuation timer 163, which will be described later.

Figure 3:
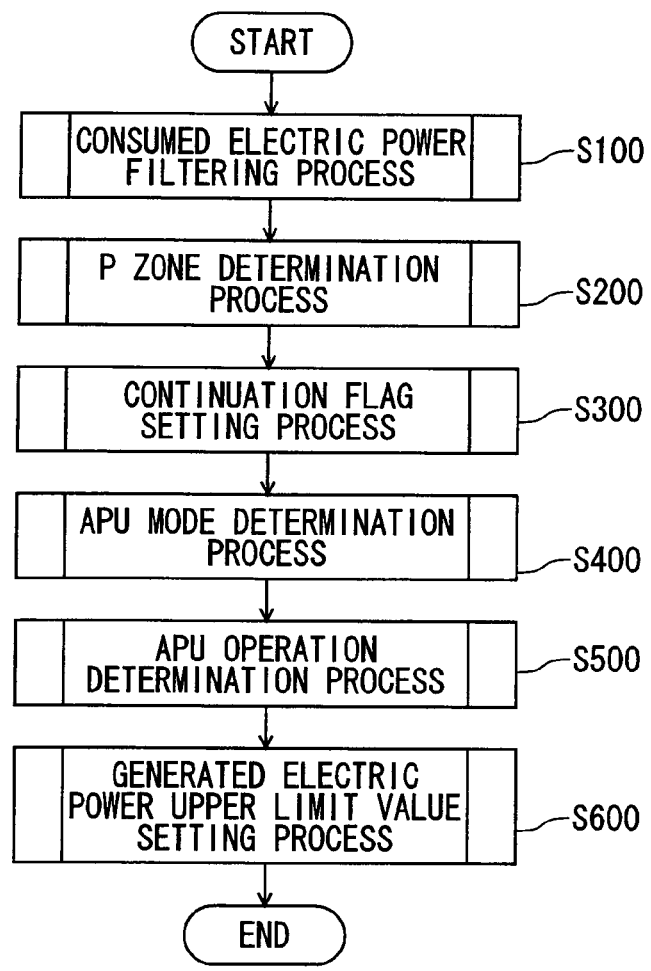
FIG. 3 is a flowchart showing the operation of the management ECU 119 of the first embodiment.
Figure 4:
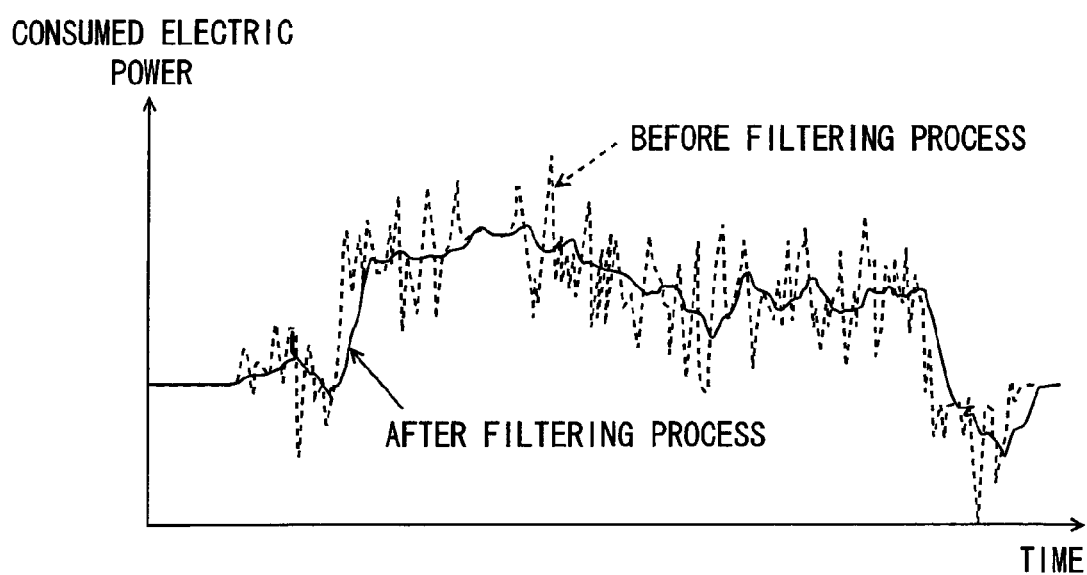
FIG. 4 is a graph showing an example of a consumed electric power (a dotted line) before a filtering process is carried out and an example of a consumed electric power (a solid line) after the filtering process is carried out.

FIG. 3 is a flowchart showing the operation of the management ECU 119 of the first embodiment. As shown in FIG. 3, the consumed electric power filtering module 151 of the management ECU 119 executes a filtering process for removing a high-frequency component from data on a variation with time of electric power that is consumed in the vehicle (hereinafter, referred to simply as "consumed electric power") (step S100). FIG. 4 is a graph showing an example of a consumed electric power (a dotted line) before a filtering process is carried out and an example of a consumed electric power (a solid line) after the filtering process is carried out. As shown in FIG. 4, the consumed electric power indicated by the solid line is obtained by applying the filtering process to the consumed electric power indicated by the dotted line.

Figure 5:
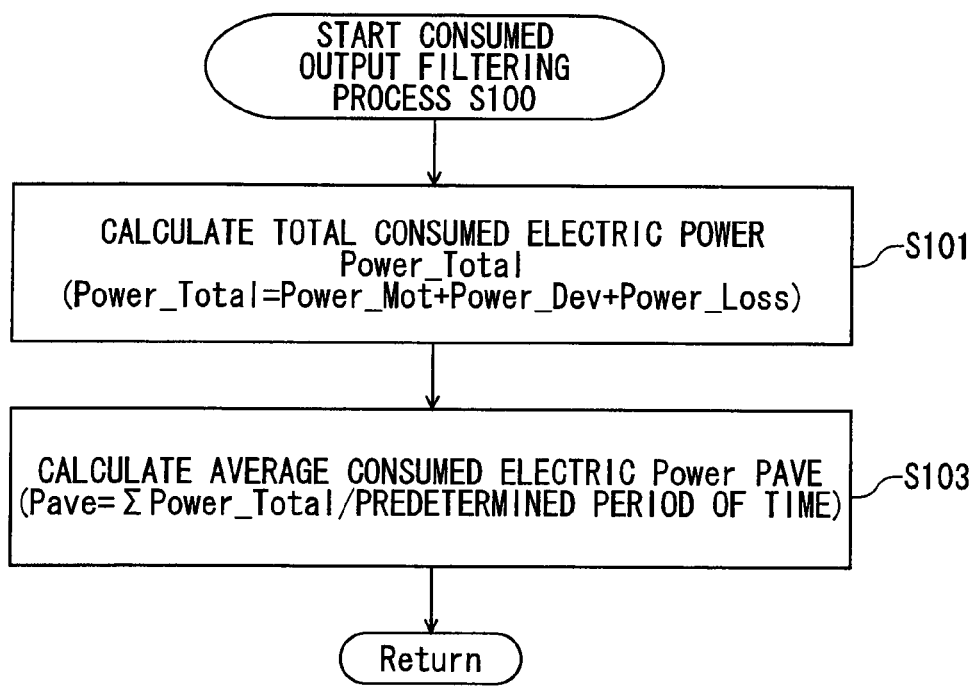
FIG. 5 is a flowchart showing in detail operations in step S100.

FIG. 5 is a flowchart showing in detail operations executed in step S100 described above. As shown in FIG. 5, the consumed electric power filtering module 151 calculates a total consumed electric power (Power_Total) by summing electric power consumed by the electric motor 107 (Power_Mot), electric power consumed by auxiliaries (Power_Dev) and electric power lost during transmission of energy (Power_Loss) which are all obtained from the management ECU 119 (step S101). Additionally, the management ECU 119 calculates an output that is required by the electric motor 107 as a drive source of the vehicle (a required output) based on the AP opening and the vehicle speed VP and calculates electric power that is consumed by the electric motor 107 (Power_Mot) when the electric motor 107 outputs the required output. In addition, the management ECU 119 calculates electric power that is consumed by the auxiliaries (Power_Dev) from information indicating the operating conditions of the auxiliaries. Further, the management ECU 119 calculates electric power that is lost during transmission of energy (Power_Loss) based on a driving mode of the vehicle and electric power that is generated by the APU 121.

Next, as the filtering process that has been described above, the consumed electric power filtering module 151 calculates an average consumed electric power (Pave) by dividing a sum of total consumed electric powers (Power_Total) of a predetermined period of time by the predetermined period of time (step S103). The length of the predetermined period of time is changed according to an output required of the electric motor 107 (a required output). Namely, the predetermined period of time is set short when a large electric output is required, whereas the predetermined period of time is set long when a small output is required. Additionally, the length of the predetermined period of time may be set according not only to the magnitude of the required output but also to the type of road on which the vehicle is driven (a steep hill or a motorway), the driving mode or the instruction from the user. In addition, the consumed electric power that is subjected to the filtering process maybe an accumulated value of the sum of total consumed electric powers (Power_Total) of the predetermined period of time.

Figure 6:
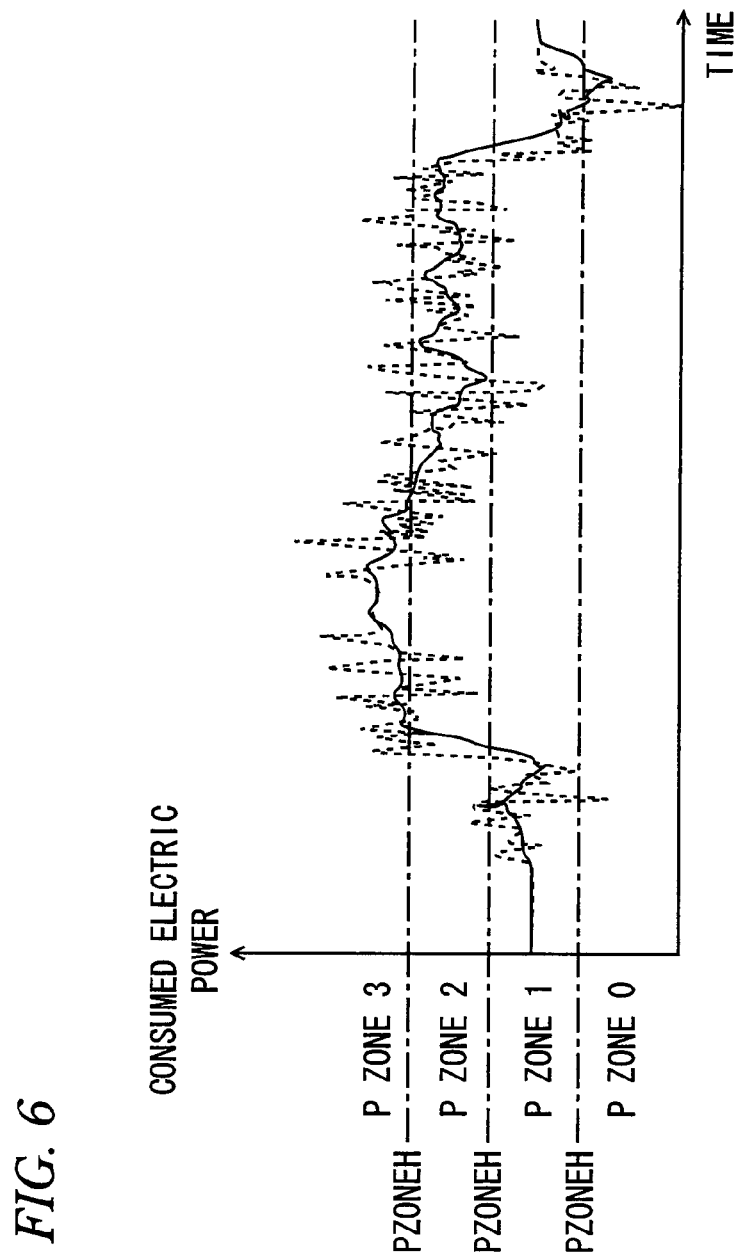
FIG. 6 is a diagram showing a relationship between consumed electric power and P zones.

As shown in FIG. 3, after step S100, the P zone determination module 153 of the management ECU 119 determines which P zone the filtered consumed electric power, that is, the average consumed electric power (Pave) belongs to (step S200). P zones are set by dividing electric power that can momentarily be consumed by the vehicle into a plurality of zones. FIG. 6 is a diagram showing a relationship between consumed electric power and P zones. As shown in FIG. 6, in this embodiment, four P zones such as a P zone 0, a P zone 1, a P zone 2, and a P zone 3 are set sequentially in ascending order of consumed electric power. Minimum consumed electric powers are set for the P zone 1, the P zone 2 and the P zone 3, respectively.

In the vehicle, electric power is consumed mainly by the electric motor 107. Consequently, a large electric power is consumed by the electric motor 107 due to a high load being applied to the electric motor 107 when the vehicle is climbing a hill or is being accelerated drastically, whereas a small electric power is consumed by the electric motor 107 due to a low load being applied to the electric motor 107 when the vehicle is stopped or is being driven at low speeds. Consequently, the P zone 3 is referred to as a high load zone, the P zone 2 as a middle load zone, the P zone 1 as a low load zone, and the P zone 0 as a fuel economy load zone in which the fuel economy is a number one priority. Additionally, the P zone 3 is a zone where the average consumed electric power (Pave) is larger than a maximum output electric power of the APU 121. Consequently, when the P zone determination module 153 determines that the current P zone is the P zone 3, electric power is supplied to the electric motor 107 from the battery 101 in addition to the maximum output electric power from the APU 121.

The continuation timer 163 that the P zone determination module 153 possesses includes a first continuation timer which decrements a predetermined period of time (TMPZL) from a point in time when the average consumed electric power (Pave) has become smaller than a minimum consumed electric power (PZONEL) of the P zone 1, a second continuation timer which decrements a predetermined period of time (TMPZM) from a point in time when the average consumed electric power (Pave) has become smaller than a minimum consumed electric power (PZONEM) of the P zone 2, and a third continuation timer which decrements a predetermined period of time (TMPZH) from a point in time when the average consumed electric power (Pave) has become smaller than a minimum consumed electric power (PZONEH) of the P zone 3.

Figure 7:
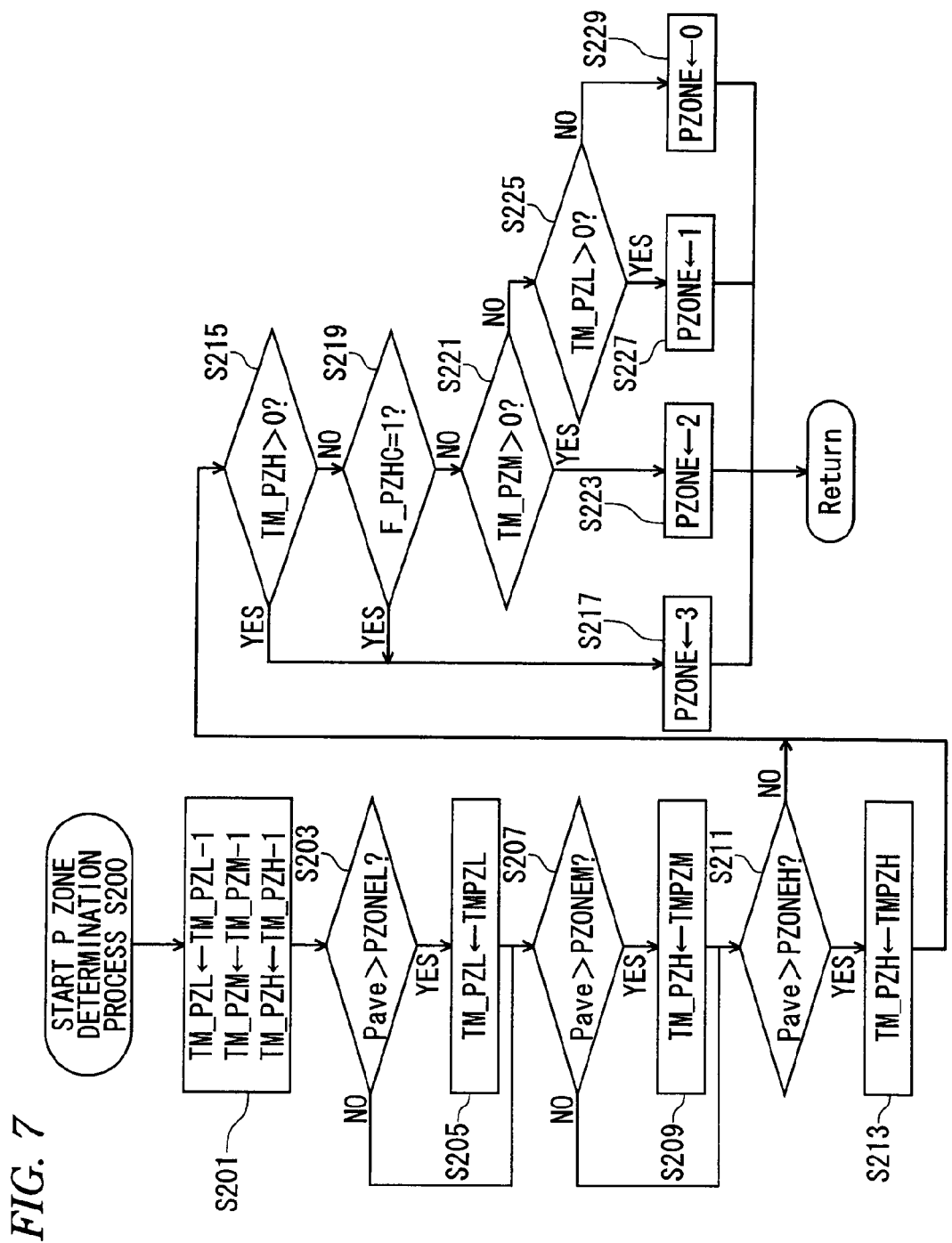
FIG. 7 is a flowchart showing in detail operations in step S200 of the first embodiment.

FIG. 7 is a flowchart showing in detail operations in step S200 that has been described above. As shown in FIG. 7, the P zone determination module 153 decrements a residual counting time (TM_PZL) of the first continuation timer, a residual counting time (TM_PZM) of the second continuation timer, and a residual counting time (TM_PZH) of the third continuation timer (step S201). Then, the P zone determination module 153 determines whether or not the average consumed electric power (Pave) is larger than the minimum consumed electric power (PZONEL) of the P zone 1 (step S203). If Pave>PZONEL, the processing flow proceeds to step S205, whereas if Pave≤PZONEL, the processing flow proceeds to step S207. In step S205, the P zone determination module 153 sets the residual counting time (TM_PZL) of the first continuation timer to the predetermined period of time (TMPZL).

In step S207, the P zone determination module 153 determines whether or not the average consumed electric power (Pave) is larger than the minimum consumed electric power (PZONEM) of the P zone 2. If Pave>PZONEM, the processing flow proceeds to step S209, whereas if Pave≤PZONEM, the processing flow proceeds to step S211. In step S209, the P zone determination module 153 sets the residual counting time (TM_PZM) of the second continuation timer to the predetermined period of time (TMPZM). In step S211, the P zone determination module 153 determines whether or not the average consumed electric power (Pave) is larger than the minimum consumed electric power (PZONEH) of the P zone 3. If Pave>PZONEH, the processing flow proceeds to step S213, whereas if Pave≤PZONEH, the processing flow proceeds to step S215. In step S213, the P zone determination module 153 sets the residual counting time (TM_PZH) of the third continuation timer to the predetermined period of time (TMPZH).

In step S215, the P zone determination module 153 determines whether or not the residual counting time (TM_PZH) of the third continuation timer is larger than 0. If TM_PZH>0, the processing flow proceeds to step S217, whereas if TM_PZH=0, the processing flow proceeds to step S219. In step S217, the P zone determination module 153 determines that the average consumed electric power (Pave) belongs to the P zone 3. In step S219, the P zone determination module 153 determines whether or not a P zone 3 continuation flag (F_PZHC), which will be described later, is set (F_PZHC=1). If the P zone 3 continuation flag is set (F_PZHC=1), the processing flow proceeds to step S217, whereas if the P zone 3 continuation flag is not set (F_PZHC=0), the processing flow proceeds to step S221.

In step S221, the P zone determination module 153 determines whether or not the residual counting time (TM_PZM) of the second continuation timer is larger than 0. If TM_PZM>0, the processing flow proceeds to step S223, whereas if TM_PZM=0, the processing flow proceeds to step S225. In step S223, the P zone determination module 153 determines that the average consumed electric power (Pave) belongs to the P zone 2.

In step S225, the P zone determination module 153 determines whether or not the residual counting time (TM_PZL) of the first continuation timer is larger than 0. If TM_PZL>0, the processing flow proceeds to step S227, whereas if TM_PZL=0, the processing flow proceeds to step S229. In step S227, the P zone determination module 153 determines that the average consumed electric power (Pave) belongs to the P zone 1. Additionally, in step S229, the P zone determination module 153 determines that the average consumed electric power (Pave) belongs to the P zone 0.

As shown in FIG. 3, after step S200, when the average consumed electric power (Pave) is determined to belong to the P zone 3, the continuation flag setting module 155 of the management ECU 119 sets the P zone 3 continuation flag (hereinafter, referred to simply as a "continuation flag") according to the residual counting time of the third continuation timer or which of the SOC and the target SOC of the battery 101 is larger or smaller (step S300). The target SOC of the battery 101 will be described later.

The continuation flag is a flag which indicates whether or not the P zone determination module continues to determine that the average consumed electric power (Pave) belongs to the P zone 3 even after the third continuation timer has finished counting the predetermined period of time (TMPZH). The P zone determination module 153 determines that the average consumed electric power (Pave) belongs to the P zone 3 when the continuation flag is set, that is, when the continuation flag is 1. On the other hand, the P zone determination module 153 determines that the average consumed electric power has shifted from the P zone 3 to the different P zone when the continuation flag is not set, that is, when the continuation flag is 0.

Figure 8:
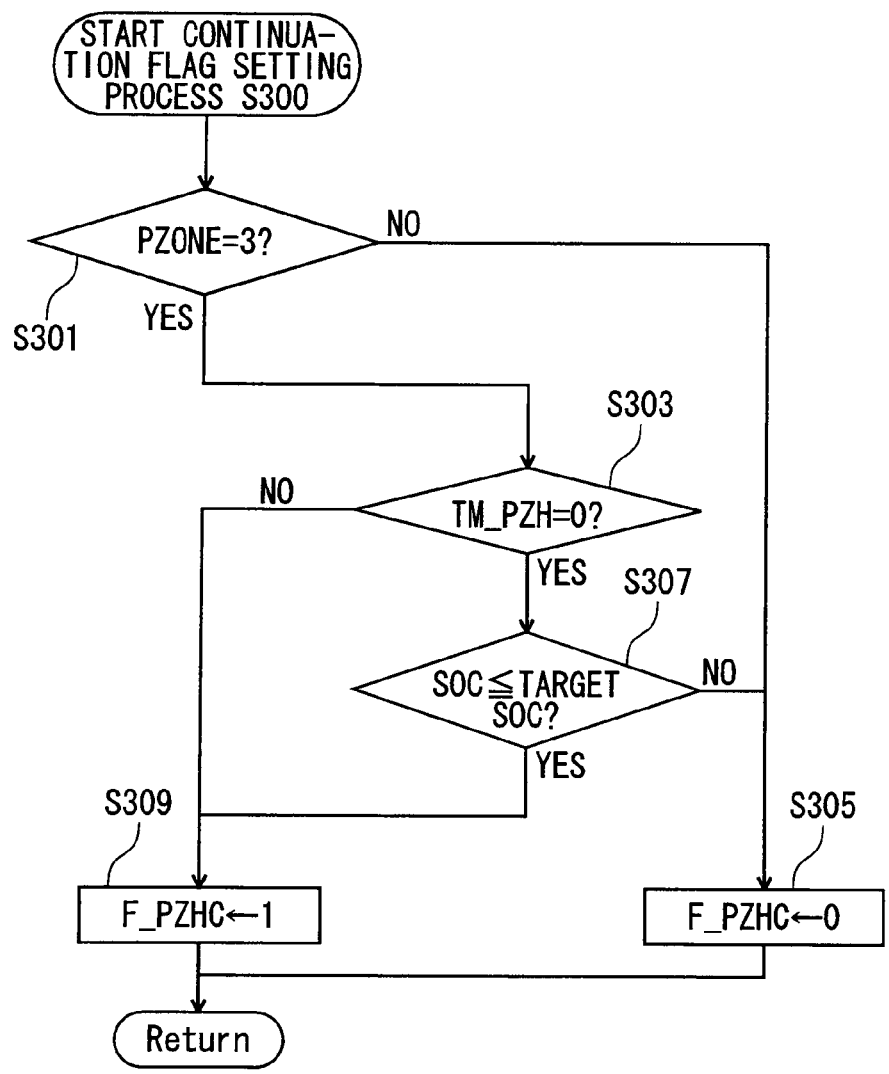
FIG. 8 is a flowchart showing in detail operations in step S300.

FIG. 8 is a flowchart showing in detail operations in step S300 that has been described above. As shown in FIG. 8, the continuation flag setting module 155 determines whether or not the P zone determined in step S200 is the P zone 3 (step S301). If the P zone is the P zone 3, the processing flow proceeds to step S303, whereas if the P zone is one of the other P zones (P zones 0 to 2), the processing flow proceeds to step S305. In step S303, the continuation flag setting module 155 determines whether or not the residual counting time (TM_PZH) of the third continuation timer is 0. If TM_PZH=0, the processing flow proceeds to step S307, whereas if TM_PZH>0, the processing flow proceeds to step S309.

In step S305, the continuation flag setting module 155 sets the continuation flag (F_PZHC) to 0. On the other hand, in step S309, the continuation flag setting module 155 sets the continuation flag (F_PZHC) to 1. Additionally, in step S307, the continuation flag setting module 155 determines whether or not the SOC of the battery 101 is equal to or smaller than the target SOC. If SOC≤target SOC, the processing flow proceeds to step S309, whereas if SOC>target SOC, the processing flow proceeds to step S305.

As shown in FIG. 3, after step S300, the APU mode determination module 157 of the management ECU 119 sets the target SOC of the battery 101 according to the P zone and determines on an operation mode of the APU 121 (the auxiliary power unit made up of the internal combustion engine 109, the generator 111 and the second inverter 113) according to the P zone to which the average consumed electric power (Pave) belongs and the relationship between the SOC and the target SOC of the battery 101 (step S400). In this embodiment, three modes are prepared as operation modes of the APU 121 (hereinafter, referred to as "APU modes"). An "APU mode 0" is a mode in which the APU 121 does not operate at all. As this mode occurs, the vehicle is driven in an EV driving. An "APU mode 1" is a mode in which the SOC of the battery 101 is maintained by running the internal combustion engine 109 so as to follow the output on a line which connects operation points where the fuel consumption is the best (a BSFC (Brake Specific Fuel Consumption) bottom line). As this mode occurs, the vehicle is driven in a series driving. An "APU mode 2" is a mode in which the reduction in SOC of the battery 101 is suppressed by running the internal combustion engine 109 at an operation point on the BSFC bottom line where the output becomes maximum. As this mode occurs, too, the vehicle is driven in the series driving. The management ECU 119 controls the APU 121 according to the APU mode that is determined by the APU mode determination module 157.

Figure 9:
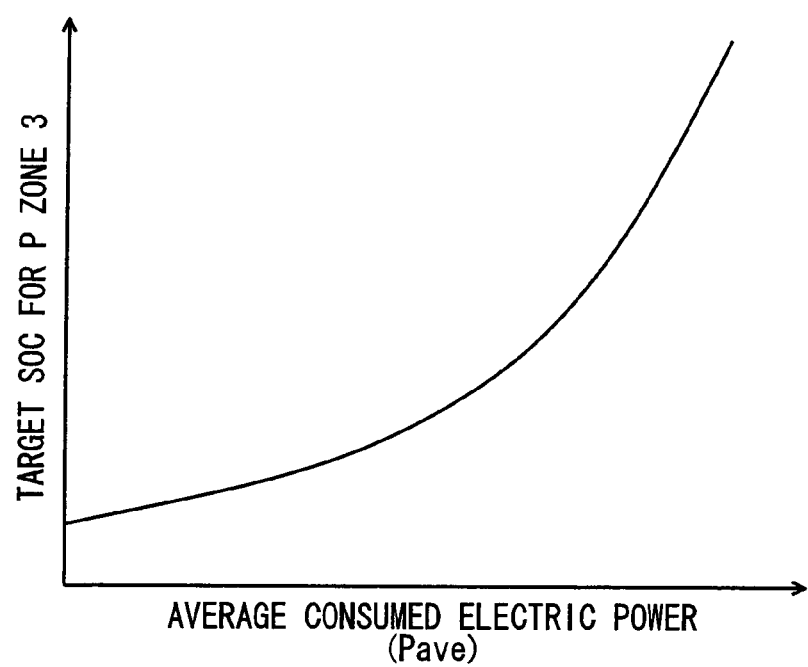
FIG. 9 is a table showing a target SOC of a P zone 3 relative to an average consumed electric power (Pave).

The battery 101 has different target SOCs for the individual P zones. The P zone 3 has a highest target SOC, and target SOCs which are associated with the P zone 2, the P zone 1 and the P zone 0 are made to decrease sequentially step by step in that order. However, as the target SOC for the P zone 3, different values are set according to the average consumed electric power (Pave) that has been described above. FIG. 9 is a table showing the target SOC of the P zone 3 relative to the average consumed electric power (Pave). As shown in FIG. 9, the target SOC of the P zone 3 is set so as to increase as the average consumed electric power (Pave) increases.

The APU mode determination module 157 calculates a target SOC which corresponds to the average consumed electric power (Pave) calculated in step S103 shown in FIG. 5 by reference to the table shown in FIG. 9 when the average consumed electric power (Pave) belongs to the P zone 3. However, although the target SOC resulting while the average consumed electric power (Pave) is determined to belong to the P zone 3 may exceed the previous value, the target SOC is set so as not to be below the previous value. Additionally, the APU mode determination module 157 may calculate a target SOC which corresponds to the average consumed electric power (Pave) by use of a calculation expression which represents the relationship shown in the table in FIG. 9. In addition, the target SOC which corresponds to the average consumed electric power (Pave) may be a specified value which is a constant value. As this occurs, minute controls by the APU mode determination module 157 can be suppressed, and therefore, the processing is quickened.

Figure 10:
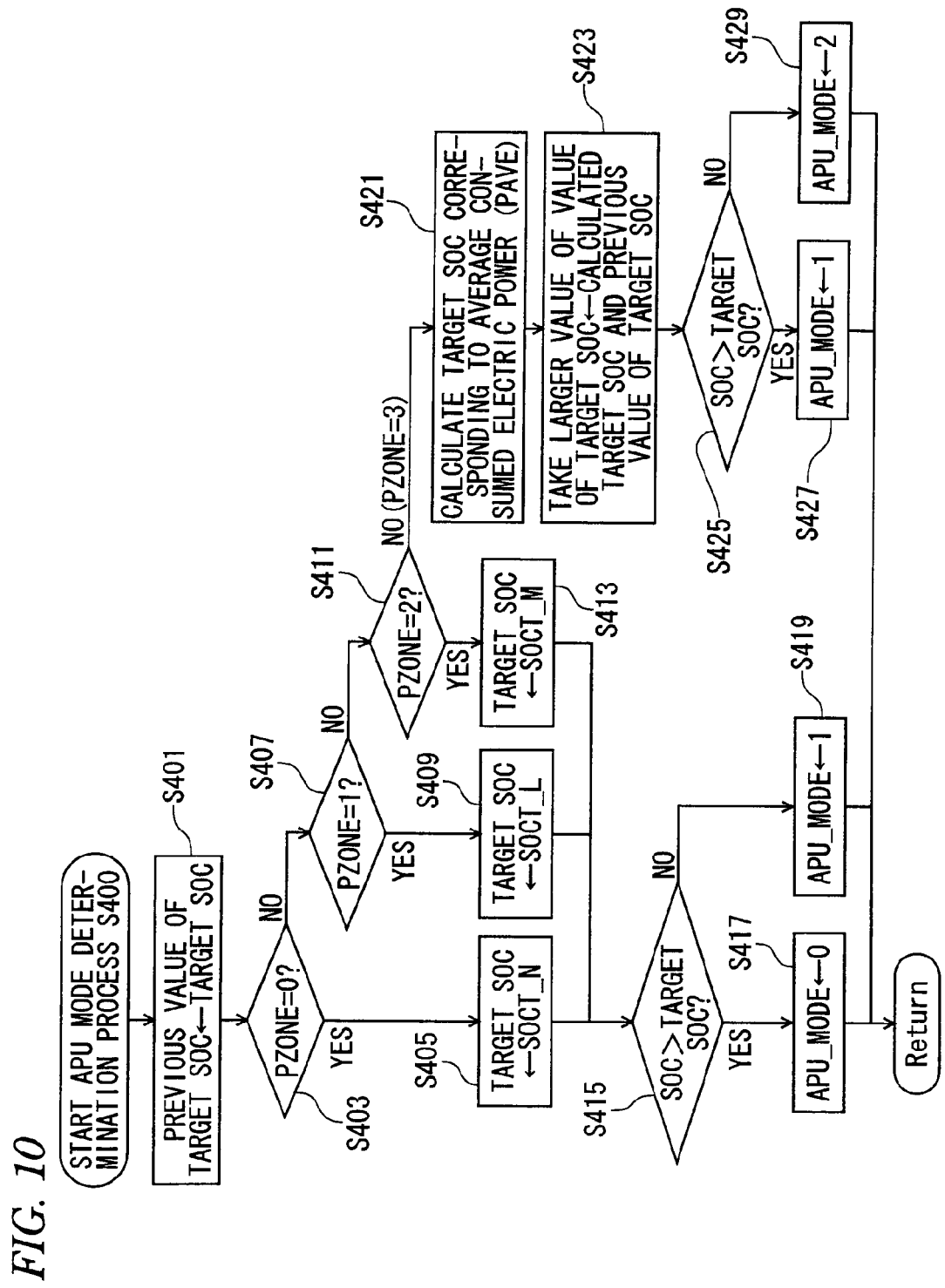
FIG. 10 is a flowchart showing in detail operations in Step S400.

FIG. 10 is a flowchart which shows in detail operations of step S400 that has been described above. As shown in FIG. 10, the APU mode determination module 157 updates the target SOC of the battery 101 (step S401). Next, the APU mode determination module 157 determines whether or not the P zone determined in step S200 is the P zone 0 (step S403). If the P zone so determined is P zone 0, the processing flow proceeds to step S405, whereas if the P zone determined is not the P zone 0, the processing flow proceeds to step S407. In step S405, the APU mode determination module 157 sets a target SOC (SOCT_N) which is associated with the P zone 0.

In step S407, the APU mode determination module 157 determines whether or not the P zone determined in step S200 is the P zone 1. If the P zone so determined is the P zone 1, the processing flow proceeds to step S409, whereas if the P zone so determined is not the P zone 1, the processing flow proceeds to step S411. In step S409, the APU mode determination module 157 sets a target SOC (SOCT_L) which is associated with the P zone 1.

In step S411, the APU mode determination module 157 determines whether or not the P zone determined in step S200 is the P zone 2. If the P zone so determined is the P zone 2, the processing flow proceeds to step S413, whereas if the P zone so determined is not the P zone 2, the processing flow proceeds to step S421. In step S413, the APU mode determination module 157 sets a target SOC (SOCT M) which is associated with the P zone 2.

After step S405, step S409 or step S413, the APU mode determination module 157 determines whether or not the SOC of the battery 101 is larger than the target SOC (step S415). If SOC>target SOC, the processing flow proceeds to step S417, whereas if SOCtarget SOC, the processing flow proceeds to step S419. In step S417, the APU mode determination module 157 determines that the operation mode of the APU 121 is the APU mode 0. On the other hand, in step S419, the APU mode determination module 157 determines that the operation mode of the APU 121 is the APU mode 1.

In step S421 which is carried out when it is determined in step S411 that the P zone is not the P zone 2, the APU mode determination module 157 calculates, by reference to the table shown in FIG. 9, a target SOC which is associated with the average consumed electric power (Pave) calculated in step S103 shown in FIG. 5. Next, the APU mode determination module 157 compares the value of the target SOC calculated in step S421 with the previous value of the target SOC and sets the target SOC whose value is larger as a target SOC for the P zone 3 (step S423).

Next, the APU mode determination module 157 determines whether or not the SOC of the battery 101 is larger than the target SOC (step S425). If SOC>target SOC, the processing flow proceeds to step S427, whereas SOCtarget SOC, the processing flow proceeds to step S429. In step S427, the APU mode determination module 157 determines that the operation mode of the APU 121 is the APU mode 1. On the other hand, in step S429, the APU mode determination module 157 determines that the operation mode of the APU 121 is the APU mode 2.

A hysteresis may be provided in the determinations which are executed in step S415 and step S425 on the comparison of the SOC of the battery 101 with the target SOC. Namely, a condition that is to be met to proceed from the state where the SOC of the battery 101 is equal to or smaller than the target SOC to step S417 or step S427 may be set so that "SOC−α>target SOC," while a condition that is to be met to proceed from the state where the SOC of the battery 101 is larger than the target SOC to step S419 or step S429 may be set so that "SOC+α≤target SOC."

As shown in FIG. 3, after step S400, the APU operation determination module 159 of the management ECU 119 determines whether or not the APU 121 is operated in the APU mode determined in step S400 according to the APU mode and the relation between the SOC of the battery 101 and the target SOC or the average consumed electric power (Pave) (step S500). Whether or not the APU 121 is permitted to be so operated which is determined by the APU operation determination module 159 based on the result of the determination is used to control the APU 121 by the management ECU 119.

Figure 11:
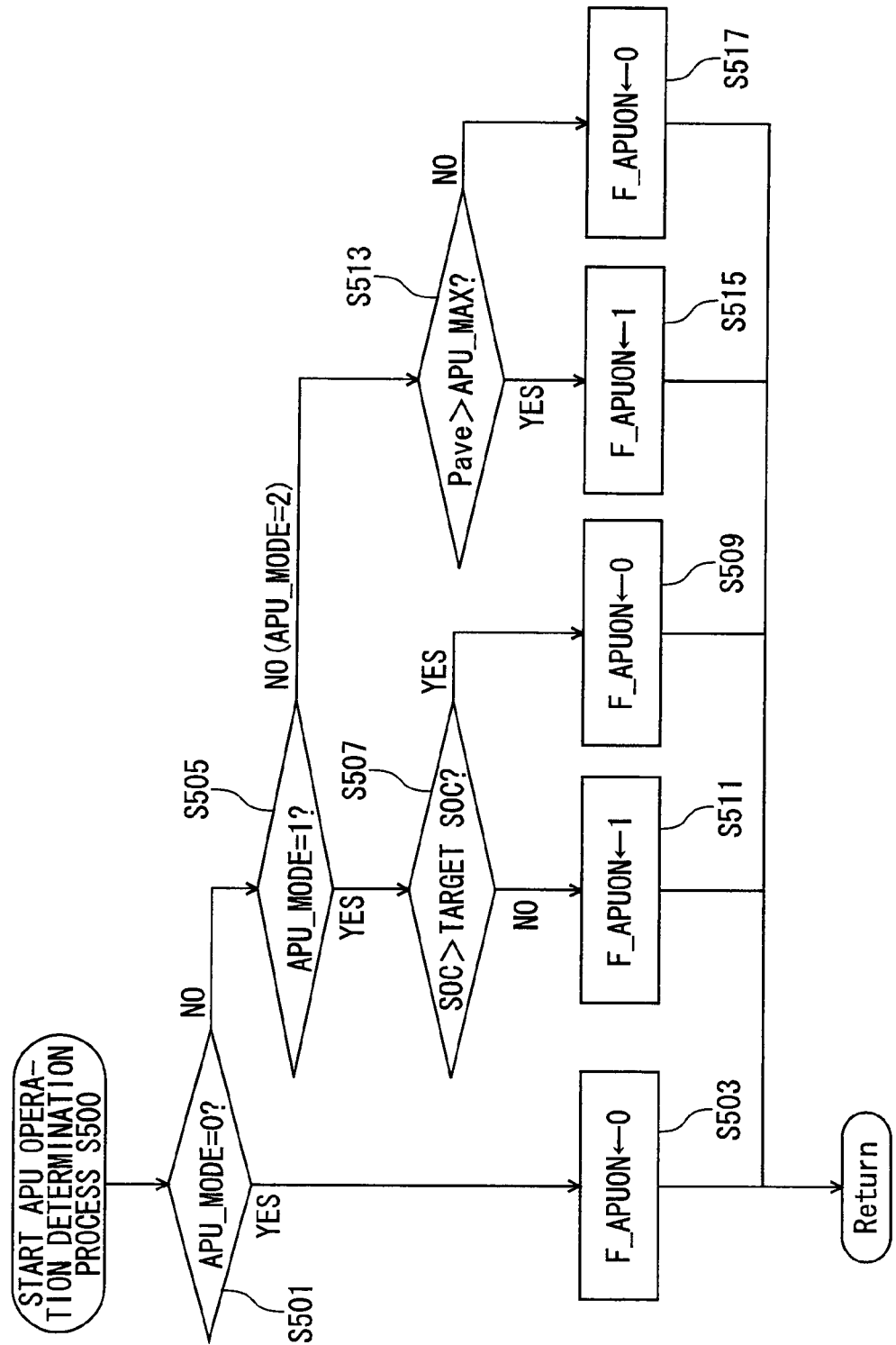
FIG. 11 is a flowchart showing in detail operations in step S500.

FIG. 11 is a flowchart showing in detail operations executed in step S500 that has been described above. As shown in FIG. 11, the APU operation determination module 159 determines whether or not it is determined in step S400 that the operation mode of the APU is the APU mode 0 (step S501). If it is determined that the operation mode of the APU is the APU mode 0, the processing flow proceeds to step S503, whereas if it is determined that the operation mode of the APU is one of the APU modes other than the APU mode 0, the processing flow proceeds to step S505. In step S503, the APU operation determination module 159 sets an APU operation permission/prohibition setting (F_APUON) which indicates the permission or prohibition of the operation of the APU 121 to 0, prohibiting the operation of the APU 121.

In step S505, the APU operation determination module 159 determines whether or not it is determined in step S400 that the operation mode of the APU is the APU mode 1. If it is determined that the operation mode of the APU is the APU mode 1, the processing flow proceeds to step S507, whereas if it is determined that the operation mode of the APU is the APU mode 2, the processing flow proceeds to step S513. In step S507, the APU operation mode determination module 159 determines whether or not the SOC of the battery 101 is larger than the target SOC. If SOC>target SOC, the processing flow proceeds to step S509, whereas if SOC≤target SOC, the processing flow proceeds to step S511. In step S509, the APU operation determination module 159 sets the APU operation permission/prohibition setting (F_APUON) to 0, prohibiting the operation of the APU 121. On the other hand, in step S511, the APU operation determination module 159 sets the APU operation permission/prohibition setting (F_APUON) to 1, permitting the operation of the APU 121.

Additionally, a hysteresis may be provided in the determination which is executed in step S507 on the comparison of the SOC of the battery 101 with the target SOC. Namely, a condition that is to be met to proceed from the state where the SOC of the battery 101 is equal to or smaller than the target SOC to step S509 may be set so that "SOC−α>target SOC," while a condition that is to be met to proceed from the state where the SOC of the battery 101 is larger than the target SOC to step S511 may be set so that "SOC+α≤target SOC."

In step S513 to which the processing flow proceeds when it is determined in step S505 that the operation mode of the APU is the APU mode 2, the APU mode determination module 159 determines whether or not the average consumed electric power (Pave) calculated in step S103 shown in FIG. 5 is larger than a maximum output electric power (APU_MAX) of the APU 121 which results when the operation mode thereof is the APU mode 2. If Pave>APU_MAX, the processing flow proceeds to step S515, whereas if Pave≤APU_MAX, the processing flow proceeds to step S517. In step S515, the APU operation determination module 159 sets the APU operation permission/prohibition setting (F_APUON) to 1, permitting the operation of the APU 121. On the other hand, in step S517, the APU operation determination module 159 sets the APU operation permission/prohibition setting (F_APUON) to 0, prohibiting the operation of the APU 121.

Additionally, a hysteresis may be provided in the determination which is executed in step S513 on the comparison of the average consumed electric power (Pave) with the maximum output electric power of the APU 121 (APU_MAX). Namely, a condition that is to be met to proceed from the state where the average consumed electric power (Pave) is equal to or smaller than the maximum output electric power of the APU 121 (APU_MAX) to step S515 may be set so that "Pave−α>APU_MAX," while a condition that is to be met to proceed from the state where the average consumed electric power (Pave) is larger than the maximum output electric power of the APU 121 (APU_MAX) to step S517 may be set so that "Pave+α>APU_MAX."

As shown in FIG. 3, after step S500, the generated electric power upper limit value setting module 161 of the management ECU 119 sets an upper limit value of electric power generated by the APU 121 (hereinafter, referred to as a "generated electric power upper limit value") according to the P zone determined in step S200 (step S600). A generated electric power upper limit value set by the generated electric power upper limit setting module 161 is used to control the APU 121 by the management ECU 119.

Figure 12:
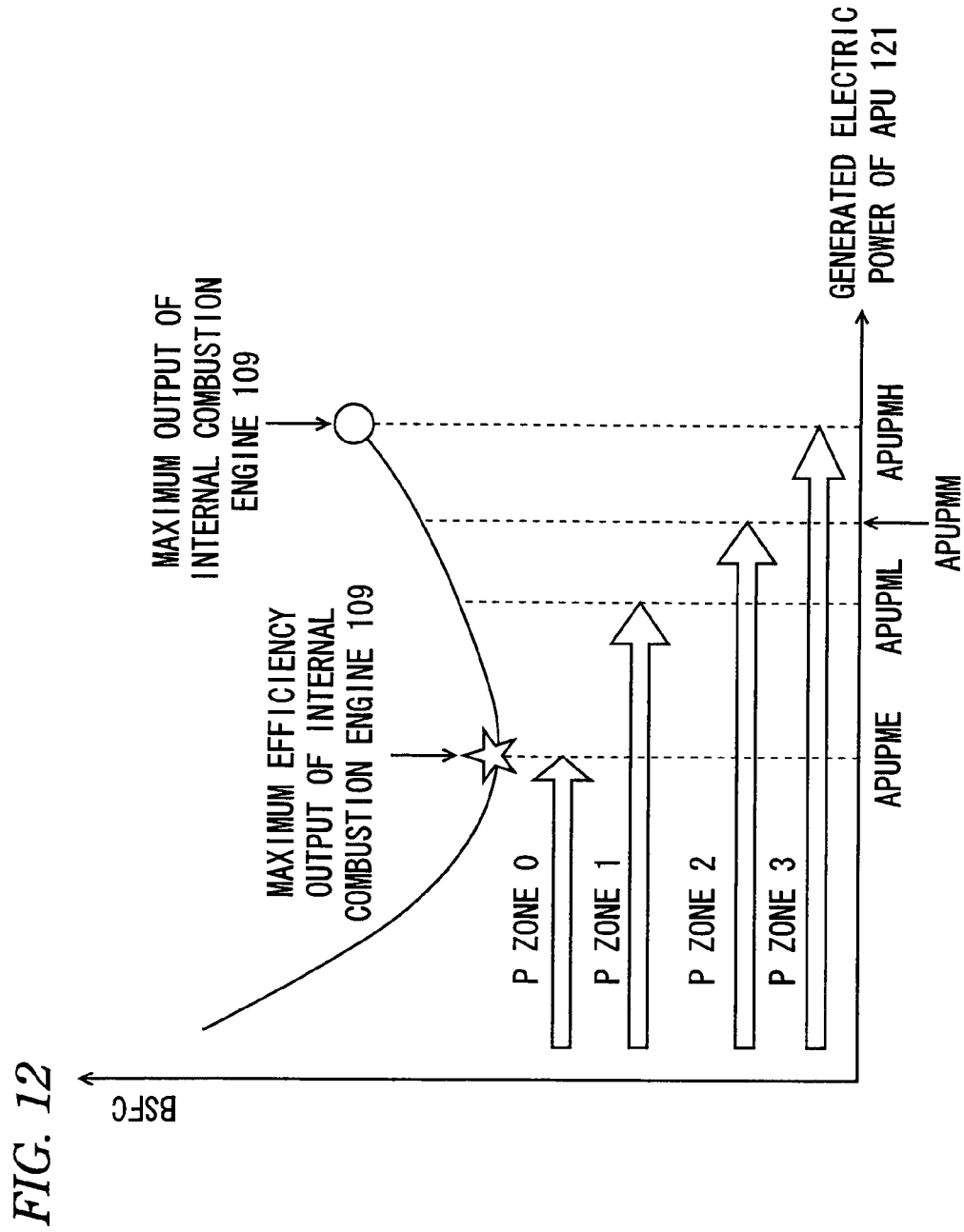
FIG. 12 is a table showing a relationship between generated electric power upper limit values for the P zones and the generated electric power upper limit values and a BSFC.

FIG. 12 is a table showing a relationship between generated electric power upper limit values for the P zones and the generated electric power upper limit values and a BSFC. As shown in FIG. 12, in the P zone 3, a maximum output of the APU 121 on the BSFC line is set as a generated electric power upper limit value. Additionally, in the P zone 0, an output of the APU 121 at an operation point where the BSFC becomes the lowest is set as a generated electric power upper limit value. In addition, in the P zone 1 and the P zone 2, values between the generated electric power upper limit value set for the P zone 3 and the generated electric power upper limit value set for the P zone 0 are set as generated electric power upper limit values for the P zones 1 and 2, respectively. However, the generated electric power upper limit value of the P zone 2 is set higher than the generated electric power upper limit value of the P zone 1.

It should be noted that the generation of electric power by the APU 121 is implemented by running the internal combustion engine 109. While the operation noise of the internal combustion engine 109 increases as the revolution speed thereof increases, the increase in operation noise deteriorates quietness (NV performance). Additionally, as shown in FIG. 12, the BSFC of the generated electric power upper limit value is improved as the P zone is lowered. On the other hand, the energy management performance is improved as the generated electric power upper limit value is set higher.

Figure 13:
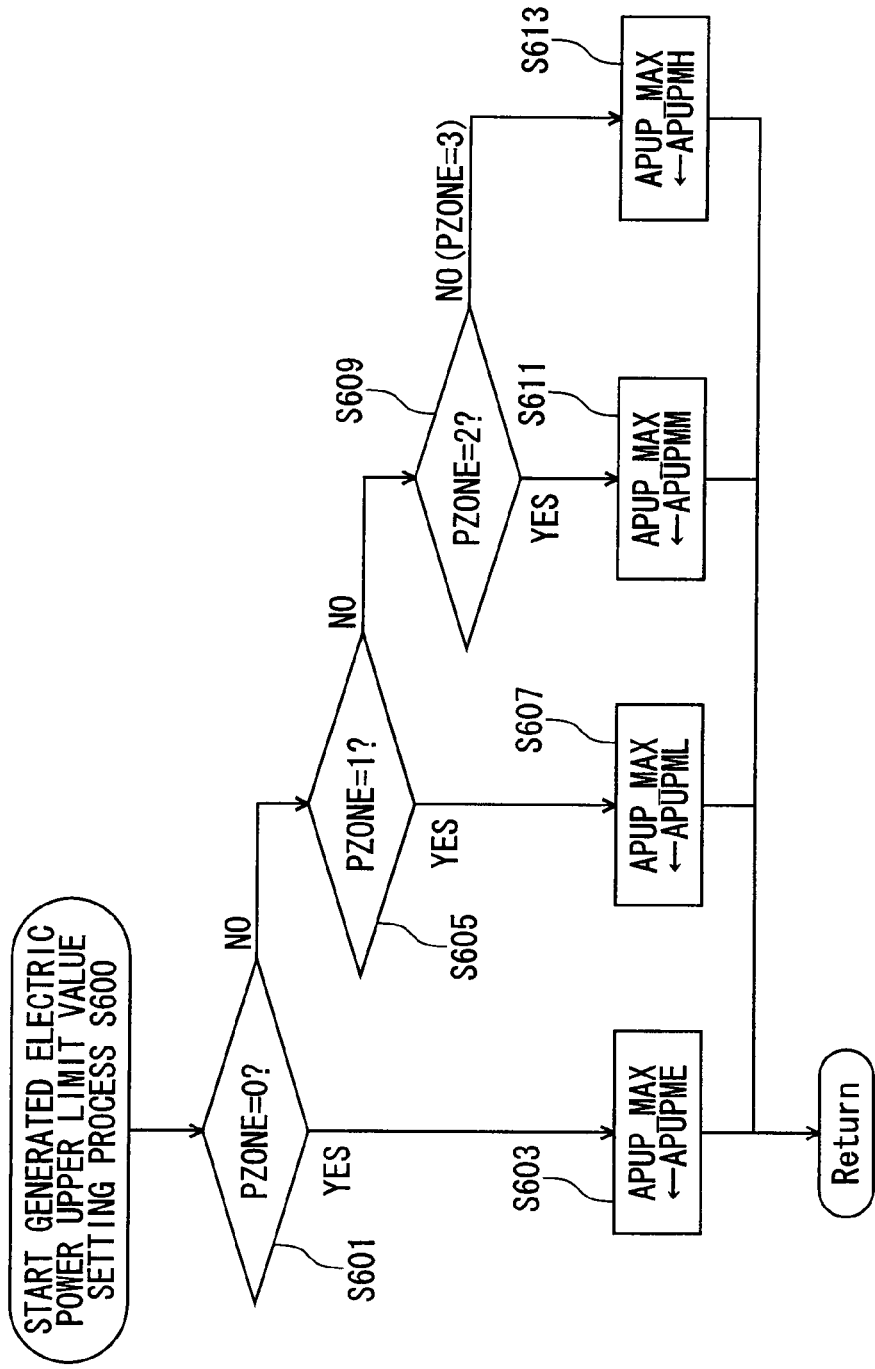
FIG. 13 is a flowchart showing in detail operations in step S600.

FIG. 13 is a flowchart showing in detail operations execute in step S600 that has been described above. As shown in FIG. 13, the generated electric power upper limit value setting module 161 determines whether or not the P zone determined in step S200 is the P zone 0 (step S601). If the P zone so determined is the P zone 0, the processing flow proceeds to step S603, whereas if the P zone so determined is one of the P zones (P zones 1 o 3) other than the P zone 0, the processing flow proceeds to step S605. In step S603, the generated electric power upper limit value setting module 161 sets the maximum output electric power of the APU 121 (APU_MAX) to a generated electric power upper limit value (APUPME) which corresponds to the P zone 0.

In step S605, the generated electric power upper limit value setting module 161 determines whether or not the P zone determined in step S200 is the P zone 1. If the P zone so determined is the P zone 1, the processing flow proceeds to step S607, whereas if the P zone so determined is one of the P zones (the P zone 2 or the P zone 3) other than the P zone 0, the processing flow proceeds to step S609. In step S607, the generated electric power upper limit value setting module 161 sets the maximum output electric power of the APU 121 (APU_MAX) to a generated electric power upper limit value (APUPML) which corresponds to the P zone 1.

In step S609, the generated electric power upper limit value setting module 161 determines whether or not the P zone determined in step S200 is the P zone 2. If the P zone so determined is the P zone 2, the processing flow proceeds to step S611, whereas if the P zone so determined is the P zone 3, the processing flow proceeds to step S613. In step S611, the generated electric power upper limit value setting module 161 sets the maximum output electric power of the APU 121 (APU_MAX) to a generated electric power upper limit value (APUPMM) which corresponds to the P zone 2. On the other hand, in step S613, the generated electric power upper limit value setting module 161 sets the maximum output electric power of the APU 121 (APU_MAX) to a generated electric power upper limit value (APUPMH) which corresponds to the P zone 3.

The management ECU 119 controls the operation of the APU 121 based on the APU mode determined by the APU mode determination module 157 in step S400, the APU operation permission/prohibition information based on the result of the determination made by the APU operation determination module 159 in step S500 and the generated electric power upper limit value set by the generated electric power upper limit value setting module 161 in step S600.

Figure 14:
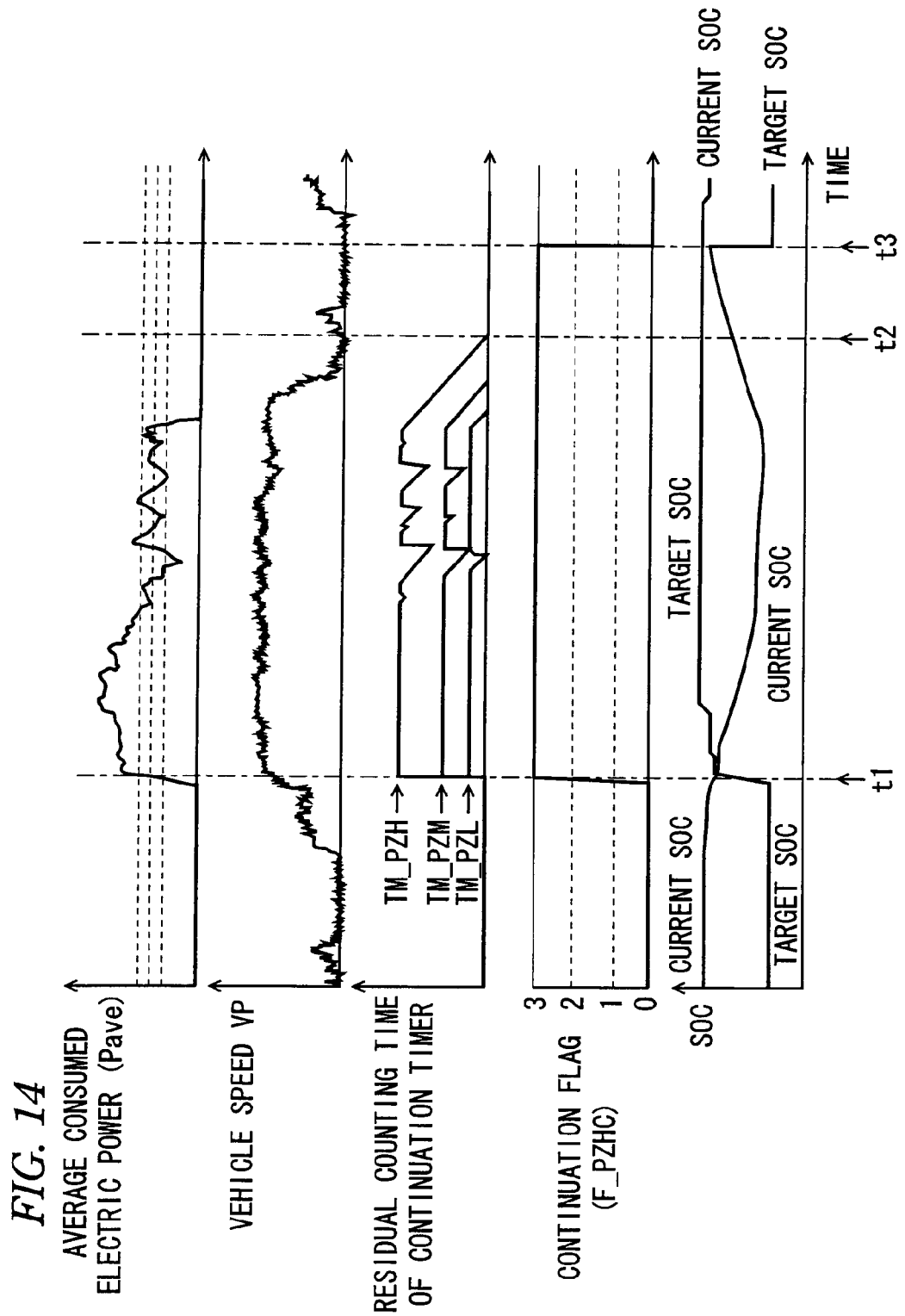
FIG. 14 is a graph showing examples of variations with time of average consumed electric power (Pave), vehicle speed VP, residual counting time of a third continuation timer, continuation flag and SOC and target SOC of a battery 101 when the management ECU 119 operates.

FIG. 14 is a graph showing examples of variations with time of average consumed electric power (Pave), vehicle speed VP, residual counting time of the third continuation timer, continuation flag and SOC and target SOC of the battery 101 when the management ECU 119 operates depending on the flowchart shown in FIG. 3. In the examples shown in FIG. 14, it is determined at time t1 that the average consumed electric power (Pave) belongs to the P zone 3, and therefore, the third continuation timer starts counting, the continuation flag is set to 1, and a target SOC for the P zone 3 is set.

There is a situation in which the average consumed electric power (Pave) becomes below the minimum consumed electric power (PZONEH) of the P zone 3 while the time elapses from time t1 to t2. However, since the residual counting time (TM_PZH) of the third continuation timer is not 0, the continuation flag (F_PZHC) is held at 1, and the target SOC is also held at a maximum value after time t1 without being changed. Thereafter, while the time elapses from time t2 to time t3, the average consumed electric power (Pave) continues to be substantially 0, and the residual counting time (TM_PZH) of the third continuation timer is also 0. However, since the SOC of the battery 101 has not yet reached the target SOC set at a point in time when the time has elapsed to time t2, the continuation flag (F_PZHC) is held at 1. As this occurs, since the APU 121 continues to be driven, the battery 101 also continues to be charged. However, the continuation flag (F_PZHC) is set to 0 at time t3 when the SOC of the battery 101 reaches the target SOC, and the operation of the APU 121 is stopped.

Thus, as has been described heretofore, according to this embodiment, even in the event that the state is changed from the state where the average consumed electric power (Pave) is determined to belong to the P zone 3 to the state where the average consumed electric power (Pave) becomes below the minimum consumed electric power (PZONEH) of the P zone 3 and the residual counting time (TM_PZH) of the third continuation timer becomes 0, the target SOC which corresponds to the P zone 3 is held as it is, and the APU 121 is caused to continue to be driven until the SOC of the battery 101 reaches the target SOC. Consequently, even in the event that a high output is required of the electric motor 107 again, the electric motor 107 can meet the requirement because the SOC of the battery 101 is high enough. In other words, it is possible to avoid a situation in which the electric motor 107 cannot meet the requirement because the SOC of the battery 101 is low.

On the other hand, in the event that it is not determined that the average consumed electric power (Pave) belongs to the P zone 3 but the state continues where the average consumed electric power (Pave) belongs to the P zones 0 to 2, the target SOC of the battery 101 is set so as to correspond to the P zone to which the average consumed electric power (Pave) belongs then. As this occurs, since the target SOCs corresponding to the P zones 0 to 2 are lower than the target SOC corresponding to the P zone 3, the discharge of $CO_2$ associated with the generation of electric power by the APU 121 is suppressed compared with the $CO_2$ discharge resulting when the average consumed electric power (Pave) belongs to the P zone 3.

In this way, when it is determined that the average consumed electric power (Pave) belongs to the P zone 3, the battery 101 is charged so that the SOC is increased to such a high level as to meet a subsequent repeated high output requirement. On the other hand, in the event that the state continues where the average consumed electric power (Pave) does not belong to the P zone 3, giving priority to suppression of $CO_2$ discharge, the target SOC of the battery 101 is set to an appropriate level. Consequently, even in the event that the electric power consumed in the vehicle belongs to any of the P zones 0 to 3, the battery 101 is held in the properly charged condition.

Additionally, as has been described in steps S513 to S515 in FIG. 11, in the event that the average consumed electric power (Pave) is larger than the maximum output electric power (APU_MAX) of the APU 121 when the APU 121 is driven in the APU mode 2, the APU operation determination module 159 that the management ECU 119 possesses permits the operation of the APU 121 before the SOC of the battery 101 reaches the target SOC. Consequently, in a situation in which a reduction in SOC is anticipated, the reduction in SOC of the battery 101 can be suppressed to a maximum extent.

For example, in the event that a process is taken in which the SOC of the battery 101 is compared with the target SOC without making the determination based on the result of the comparison of the average consumed electric power (Pave) with the maximum output electric power (APU_MAX) of the APU 121 in step S513, and if SOC≤target SOC, the processing flow proceeds to step S515, whereas if SOC>target SOC, the processing flow proceeds to step S517, the operation of the APU 121 is not permitted until the SOC of the battery 101 is reduced to the target SOC. In contrast with this, according to the embodiment, the timing at which the APU 121 is put in operation can be put forward when the operation mode of the APU 121 is the APU mode 2 in which a reduction in SOC is anticipated.

(Second Embodiment)

A vehicle of a second embodiment is a plug-in HEV in which a battery 101 can be charged by electric power that is supplied from an external power supply unit connected to a commercial alternating current power supply or the like by way of a charging cable.

Figure 15:
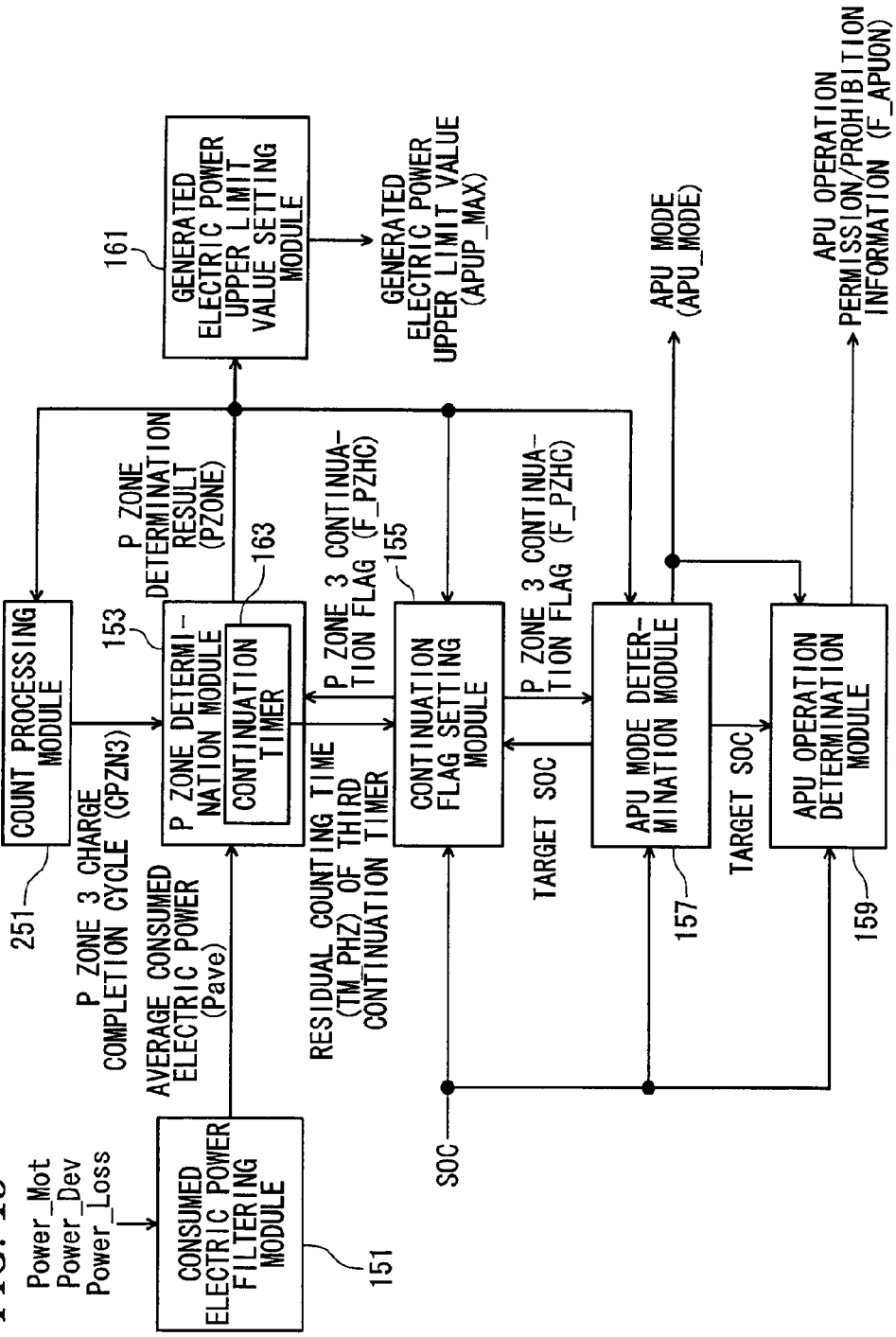
FIG. 15 is a block diagram showing an internal configuration of a management ECU 219 provided in an HEV of a second embodiment.

FIG. 15 is a block diagram showing an inner configuration of a management ECU 219 provided in the HEV of the second embodiment. The management ECU 219 of the second embodiment has, further, a count processing module 251 in addition to the constituent elements that the management ECU 119 of the first embodiment possesses.

Figure 16:
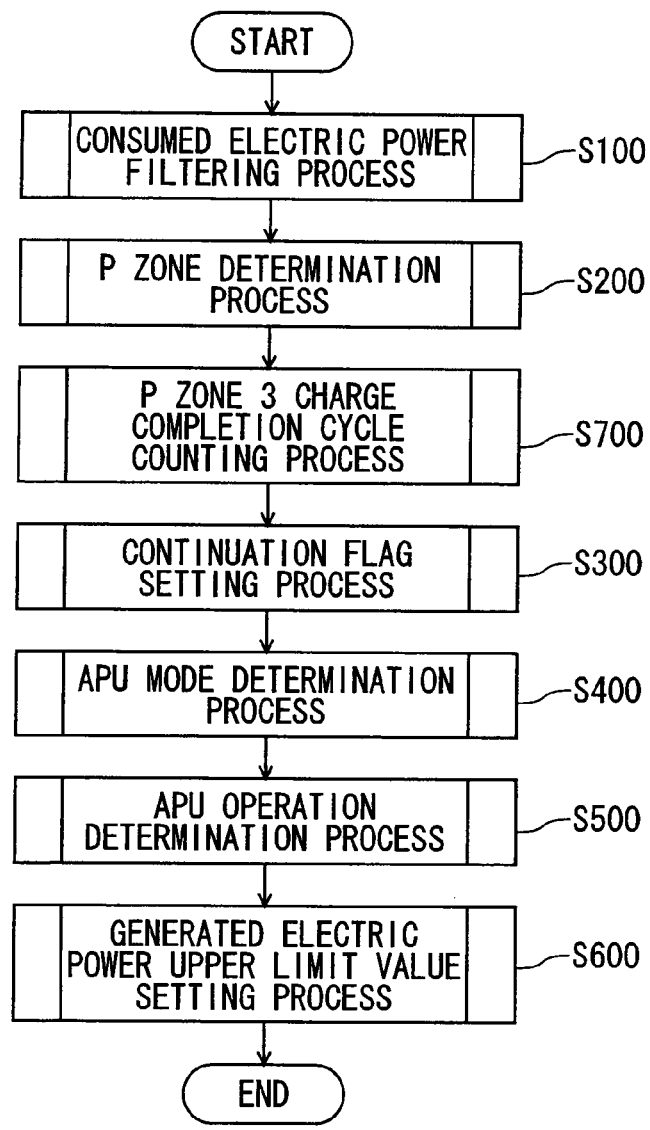
FIG. 16 is a flowchart showing the operation of the management ECU 219 of the second embodiment.

FIG. 16 is a flowchart showing the operation of the management ECU 219 of the second embodiment. In the second embodiment, part of the operation of the management ECU 219 differs from the operation of the management ECU 119 of the first embodiment. Because of this, in respect of the operation of the management ECU219 of the second embodiment, like reference numerals or corresponding reference numerals will be given to the same operations or corresponding steps to those of the management ECU 119 of the first embodiment, so that the description thereof will be simplified or omitted herein.

As shown in FIG. 16, the count processing module 251 counts the number of cycles in which the battery 101 is charged to a target SOC which is set when an average consumed electric power (Pave) belongs to a P zone 3 (hereinafter, referred to as a "P zone 3 charge completion cycle") by generated electric power from an APU 121 (step S700).

Figure 17:
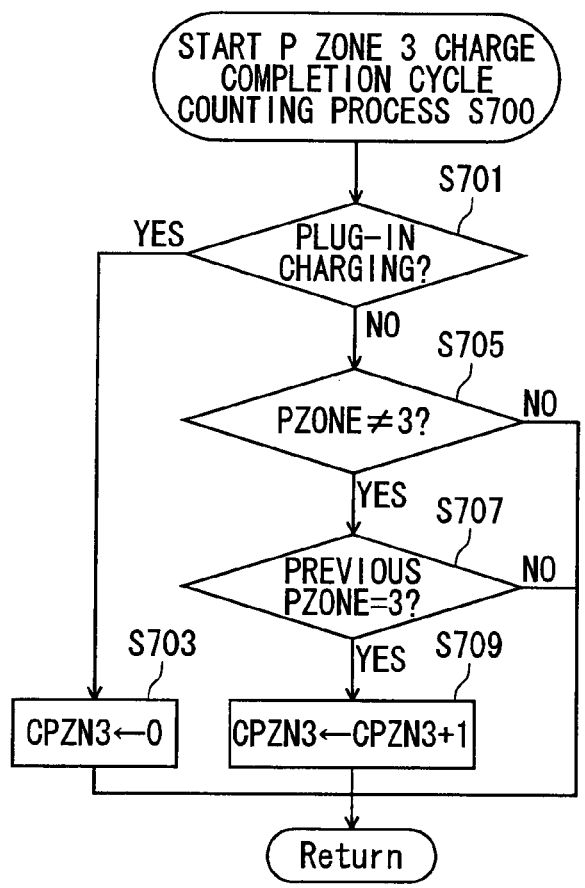
FIG. 17 is a flowchart showing in detail operations in step S700.

FIG. 17 is a flowchart showing in detail operations executed in step S700. As shown in FIG. 17, the count processing module 251 determines whether or not the battery 101 is charged up by electric power from an external power supply unit (step S701). If the battery 101 is charged up by the electric power from the external power supply unit, the processing flow proceeds to step S703, whereas if the batter 101 is charged up by electric power from the APU 121, the processing flow proceeds to step S705. In step S703, the count processing module 251 sets the P zone 3 charge completion cycle (CPZN3) to 0.

In step S705, the count processing module 251 determines whether or not a P zone determined in step S200 is the P zone 3. If the P zone so determined is one of P zones (P zones 0 to 2) other than the P zone 3, the processing flow proceeds to step S707, whereas if the P zone so determined is the P zone 3, the processes in relation to step S700 end. In step S707, the count processing module 251 determines whether or not the P zone determined in step S200 in the routine that has occurred just before the current routine. If the P zone so determined is the P zone 3, the processing flow proceeds to step S709, whereas if the P zone so determined is one of the P zones (P zones 0 to 2) other than the P zone 3, the processes in relation to step S700 end. In step S709, the count processing module 251 increments the P zone 3 charge completion cycle (CPZN3).

Figure 18:
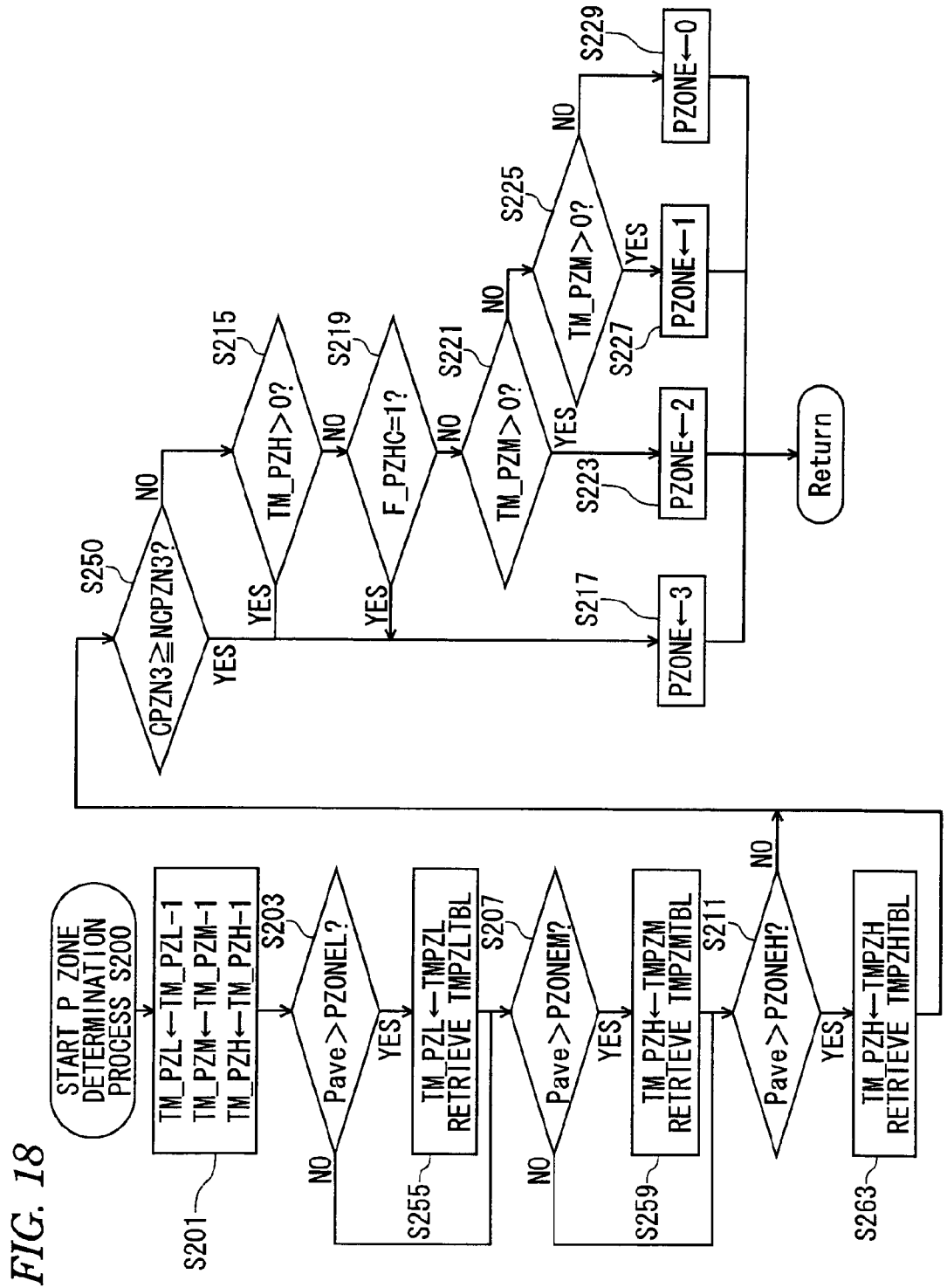
FIG. 18 is a flowchart showing in detail operations in step S200 of the second embodiment.

FIG. 18 is a flowchart showing in detail operations executed in step S200 of the second embodiment. As shown in FIG. 18, in step S200 of the second embodiment, step S255 is executed in place of step S205 shown in FIG. 7, step S259 is executed in place of step S209, and step S263 is executed in place of step S213. Additionally, step S215 is not executed but step S250 is executed after step S211 or step S263.

In step S255, a P zone determination module 153 sets a predetermined period of time (TMPZL) which corresponds to the P zone 3 charge completion cycle (CPZN3) as a residual counting time (TM_PZL) of a first continuation timer. Additionally, in step S259, the P zone determination module 153 sets a predetermined period of time (TMPZM) which corresponds to the P zone 3 charge completion cycle (CPZN3) as a residual counting time (TM_PZM) of a second continuation timer. In addition, in step S263, the P zone determination module 153 sets a predetermined period of time (TMPZH) which corresponds to the P zone 3 charge completion cycle (CPZN3) as a residual counting time (TM_PZH) of a third continuation timer.

Figure 19:
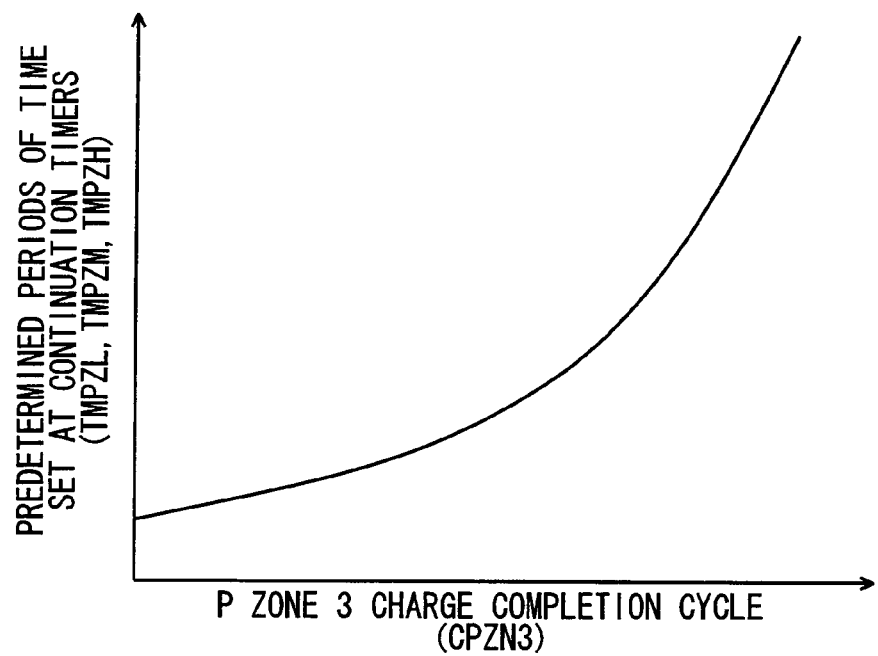
FIG. 19 is a graph showing a relationship between the number of charge completion cycles of P zone 3 (CPZN3) and predetermined period of times (TMPZL, TMPZM, TMPZH) which are set in respective continuation timers.

FIG. 19 is a graph showing a relationship between the P zone 3 charge completion cycle (CPZN3) and the predetermined periods of time (TMPZL, TMPZM, TMPZH) which are set respectively for the continuation timers. As shown in FIG. 19, the predetermined periods of time which are set respectively for the continuation timers become longer as the P zone 3 charge completion cycle (CPZN3) increases. It should be noted that the predetermined period of time (TMPZL) set for the first continuation timer and the predetermined period of time (TMPZM) set for the second continuation timer may take fixed values. Additionally, the predetermined periods of time set respectively for the continuation timers may become longer as the number of cycles the battery 101 is charged to the target SOC of the corresponding P zone increases.

In step S250, the P zone determination module 153 determines whether or not the P zone 3 charge completion cycle (CPZN3) is equal to or larger than a predetermined number of cycles (NCPZN3). If CPZN3≧NCPZN3, the processing flow proceeds to step S217, and the P zone determination module 153 determines that the average consumed electric power (Pave) belongs the P zone 3. On the other hand, if CPZN3<NCPZN3, the processing flow proceeds to step S215.

Figure 20:
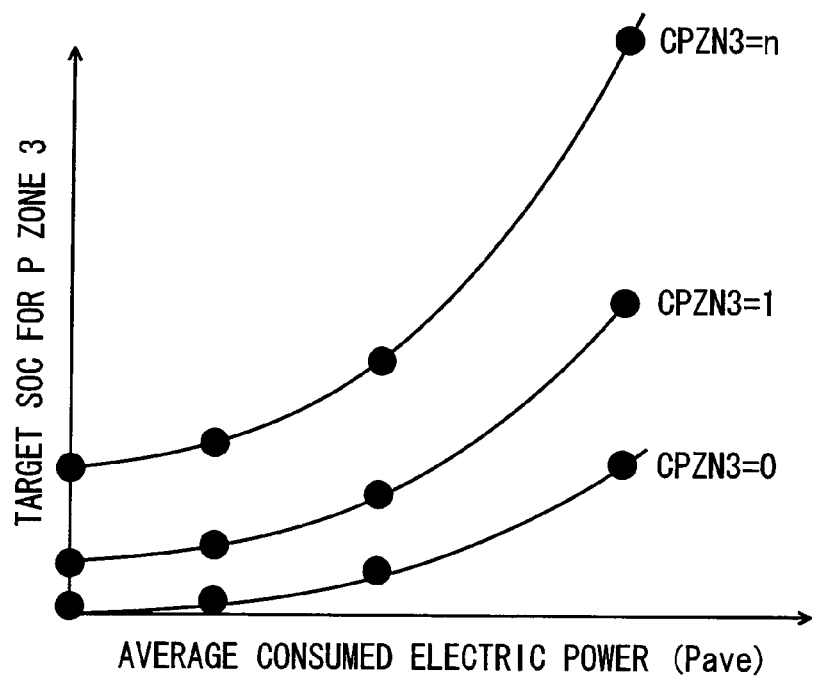
FIG. 20 is a table showing average consumed electric power (Pave) and target SOC for P zone 3 relative to P zone 3 charge completion cycle (CPZN3).

Additionally, as with the first embodiment, a target SOC which corresponds to the P zone 3 in this embodiment is set in step S421 and step S432 shown in FIG. 10. However, in this embodiment, a target SOC which differs based not only on the average consumed electric power (Pave) but also on the P zone 3 charge completion cycle (CPZN3) is set in a table which is used in step S421 to calculate a target SOC. FIG. 20 is a table showing the average consumed electric power (Pave) and the target SOC for the P zone 3 relative to the P zone 3 charge completion cycle (CPZN3). As shown in FIG. 20, the target SOC corresponding to the P zone 3 is set higher as the average consumed electric power (Pave) increases or the P zone 3 charge completion cycle (CPZN3) increases.

An APU mode determination module 157 of this embodiment calculates a target SOC which corresponds to the average consumed electric power (Pave) calculated in step S103 shown in FIG. 5 and the P zone 3 charge completion cycle (CPZN3) counted instep S700 shown in FIG. 16 by reference to the table shown in FIG. 20 in step S421.

It is anticipated that the possibility or frequency at which a high output is required of the electric motor 107 is high when the P zone 3 charge completion cycle (CPZN3) is equal to or larger than the predetermined number of cycles (NCPZN3). In this embodiment, it is determined at all times that the average consumed electric power (Pave) belongs to the P zone 3 irrespective of the states of the average consumed electric power (Pave), the residual counting time (TM_PZH) of the third continuation timer and the P zone 3 continuation flag (F_PZHC) when the P zone 3 charge completion cycle (CPZN3) is equal to or larger than the predetermined number of cycles (NCPZN3). In this way, even in the event that the high output is required of the electric motor 107 over a long period of time, the electric motor 107 can meet the requirement by holding the target SOC high without releasing the P zone 3.

Additionally, it is anticipated that the possibility or frequency at which the high output is required of the electric motor 107 becomes higher as the P zone 3 charge completion cycle (CPZN3) increases. In this embodiment, the predetermined period of time which is set in particular at the third continuation timer of the continuation timer 163 becomes longer and the target SOC of the battery 101 is set higher as the P zone 3 charge completion cycle (CPZN3) increases. Consequently, according to the invention, when the high output is required of the electric motor 107 over the long period of time, the electric motor 107 can meet the requirement.

On the contrary, it is anticipated that the possibility or frequency at which the high output is required of the electric motor 107 becomes lower as the P zone 3 charge completion cycle (CPZN3) decreases. In this embodiment, the predetermined period of time which is set in particular at the third continuation timer of the continuation timer 163 becomes shorter and the target SOC of the battery 101 is set lower as the P zone 3 charge completion cycle (CPZN3) decreases. Additionally, the driving time of the APU 121 becomes shorter as the predetermined period of time which is set at the third continuation timer becomes shorter, and therefore, the $CO_2$ discharge which is associated with the driving of the APU 121 becomes lower. In this way, according to the embodiment, the $CO_2$ discharge can be suppressed while setting the target SOC of the battery 101 at the appropriate level.

Figure 21:
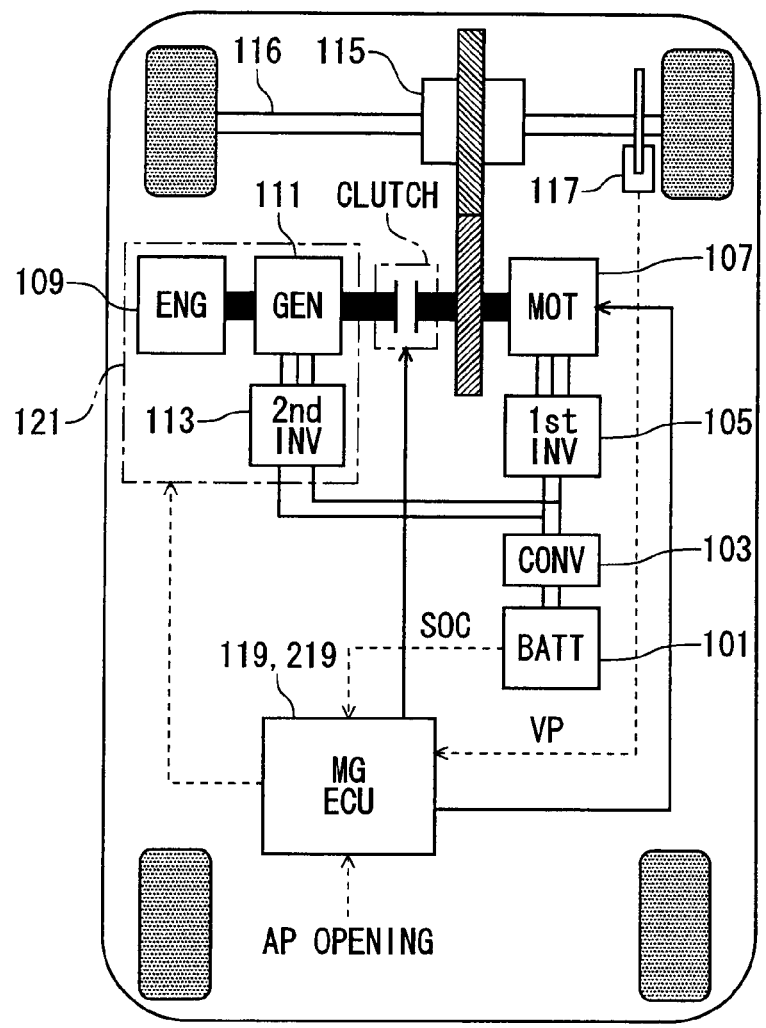
FIG. 21 is a block diagram showing an internal configuration of a series/parallel HEV.
Figure 22:
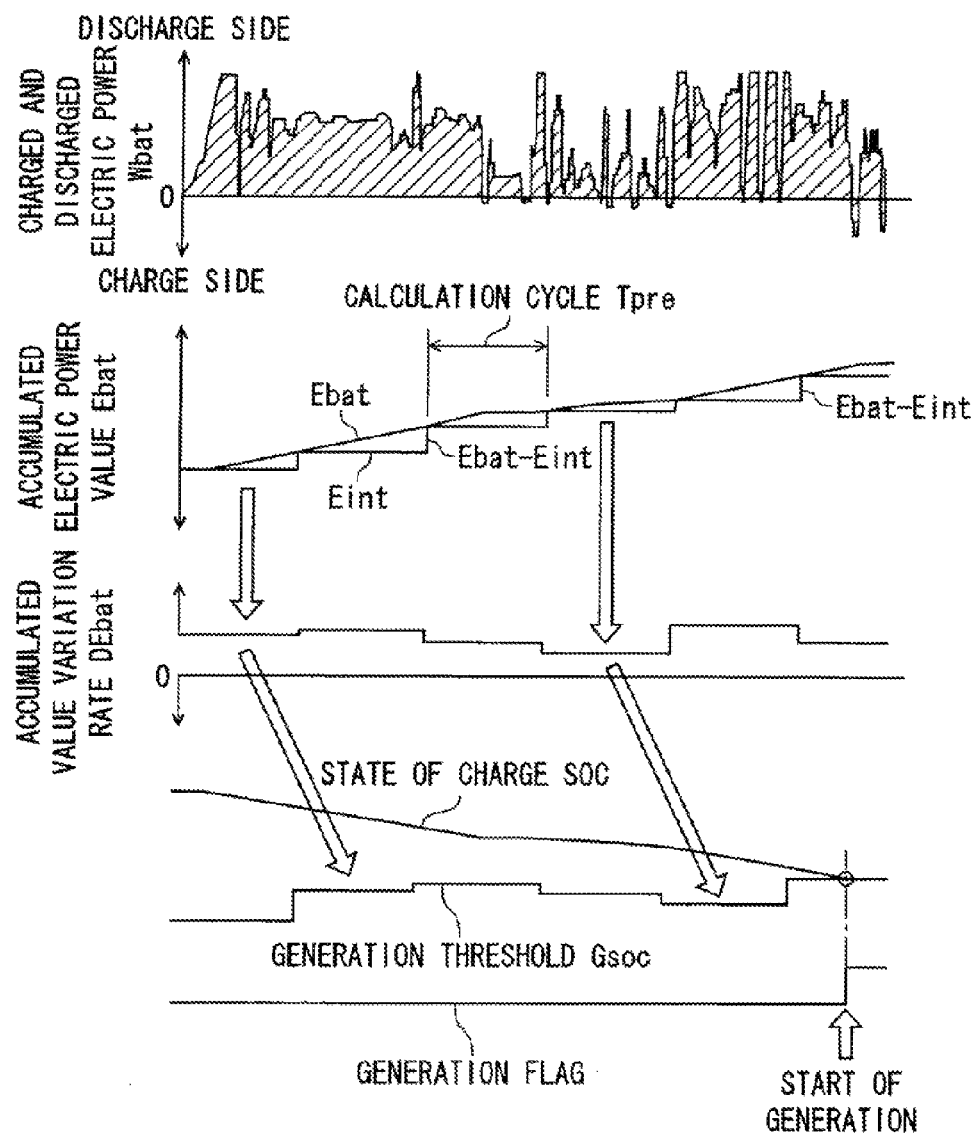
FIG. 22 is a diagram showing variations of various data in a process until generation is started in a hybrid vehicle described in Patent Document 1.
Figure 23:
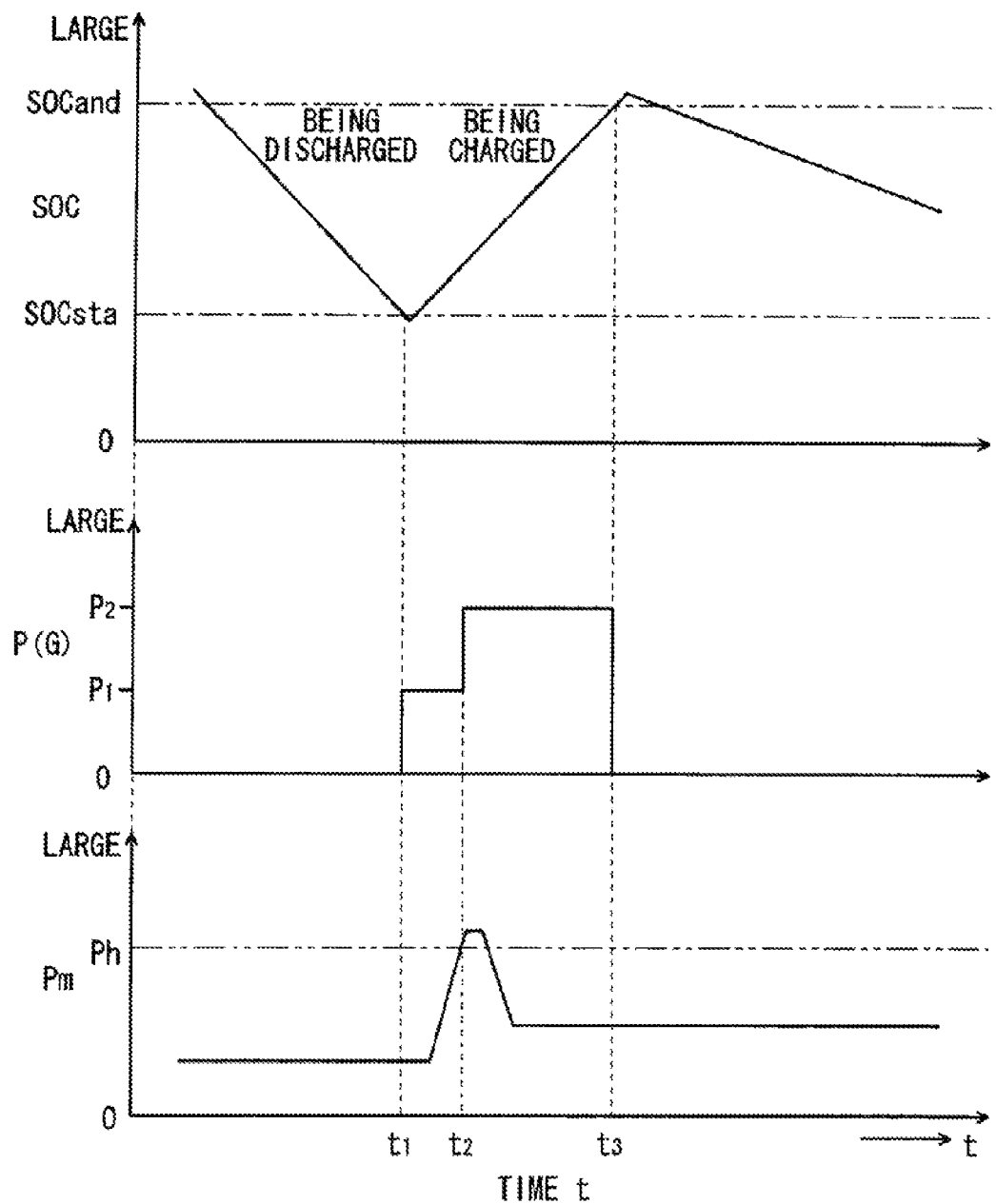
FIG. 23 is a time chart showing an example of a control result of a generation control by a generation control apparatus described in Patent Document 2.

It should be noted that while the embodiments are described by taking the series HEV as the example, the invention can also be applied to a series/parallel HEV shown in FIG. 21.

Further, there is provided a generation control apparatus characterized by including a first generation mode for holding the state of charge of the battery and characterized in that the generation control apparatus controls the operation of the generation unit based on the first generation mode after the battery has reached the target state of charge.

Further, there is provided a generation control apparatus for a hybrid vehicle including a rechargeable battery which supplies electric power to an electric motor which is a drive source of the hybrid vehicle and a generation unit having an internal combustion engine and a generator which generates electric power by operation of the internal combustion engine and adapted to supply generated electric power to the electric motor or the battery, characterized by including a zone determination module which determines whether or not an electric power that is consumed in the hybrid vehicle over a predetermined period of time belongs to a high load zone which is equal to or larger than a threshold, a time counting module which counts a time that has elapsed from a point in time when the consumed electric power over the predetermined period of time departed from the high load zone, a target state of charge setting module which sets different target states of charge for the battery according to the result of the determination of whether or not the consumed electric power over the predetermined period of time belongs to the high load zone, a continuation flag setting module which sets a continuation flag to indicate that the determination continues to be held that the consumed electric power over the predetermined period of time belongs to the high load zone in the event that the battery has not yet reached the target state of charge even after the consumed electric power over the predetermined period of time has departed from the high load zone and the time counting module has finished counting the predetermined period of time, and a generation control module which controls the operation of the generation unit so that the battery reaches the target state of charge by charging the battery using electric power from the generation unit and characterized in that the generation control apparatus has a second generation mode for controlling the generation unit so as to suppress the reduction of the state of charge of the battery, in that when the continuation flag indicates that the determination continues to be held that the consumed electric power over the predetermined period of time belongs to the high load zone, the continuation flag setting module holds the state of the continuation flag until the state of charge of the battery reaches the target state of charge which is set by the target state of charge setting module when the zone determination module determines that the consumed electric power over the predetermined period of time belongs to the high load zone, and in that the generation control apparatus controls the operation of the generation unit based on the second generation mode in the event that the battery has not yet reached the target state of charge when the zone determination module determines that the consumed electric power over the predetermined period of time belongs to the high load zone.

Further, there is provided a generation control apparatus, characterized in that the generation control apparatus has a first generation mode for holding the state of charge of the battery, and controls the operation of the generation unit based on the first generation mode after the battery has reached the target state of charge.

Further, there is provided a generation control apparatus, characterized by including a counting module which counts the number of cycles in which the battery is charged to the target state of charge which is set at the high load state by generated electric power from the generation unit, and characterized in that when the number of cycles counted by the counting module is equal to or larger than a predetermined number of cycles, the target state of charge which is set at the high load state is set as the target state of charge of the battery.

Further, there is provided a generation control apparatus, characterized in that the consumed electric power over the predetermined period of time which results when it is determined to belong to the high load zone by the zone determination module is larger than the maximum output electric power of the generation unit.

Further, there is provided a generation control apparatus, characterized in that the target state of charge setting module calculates a target value which corresponds to the consumed electric power over the predetermined period of time by making use of a table or a calculation expression in relation to the target state of charge in which different target values are set according to electric power and sets the previous target value as the target state of charge when a target value which is lower than the previous target value is calculated while it is determined by the zone determination module that the consumed electric power over the predetermined period of time belongs to the high load zone.

Further, there is provided a generation control apparatus, characterized by including a counting module which counts the number of cycles in which the battery is charged to the target state of charge which is set when it is determined that the consumed electric power over the predetermined period of time belongs to the high load zone by generated electric power from the generation unit, and characterized in that when the number of cycles counted by the counting module is equal to or larger than a predetermined number of cycles, the target state of charge setting module sets the target state of charge which results when it is determined that the consumed electric power over the predetermined period of time belongs to the high load zone.

Further, there is provided a generation control apparatus, characterized by including a counting module which counts the number of cycles in which the battery is charged to the target state of charge which is set when it is determined that the consumed electric power over the predetermined period of time belongs to the high load zone by generated electric power from the generation unit, and characterized in that the target value which differs according to the electric power is set so as to become high as the number of cycles increases in the table or the calculation expression, and in that when the number of cycles counted by the counting module is equal to or larger than a predetermined number of cycles, the target state of charge setting module sets the target state of charge which results when it is determined that the consumed electric power over the predetermined period of time belongs to the high load zone.

Further, there is provided a generation control apparatus, characterized in that when the operation of the generation unit is controlled based on the second generation mode, the generation unit is activated before the battery reaches the target state of charge.

Further, there is provided a generation control apparatus, characterized in that the consumed electric power over the predetermined period of time is an average or accumulated electric power that is consumed in the hybrid vehicle over the predetermined period of time.

Additionally, according to the generation control apparatus, when the operation of the generation unit is controlled based on the second generation mode, the generation unit is activated before the battery reaches the target state of charge, and therefore, in the situation in which the reduction of the state of charge of the battery is anticipated in which the generation unit is set to the second generation mode, the reduction of the state of charge of the battery can be suppressed to a maximum extent.

In addition, according to the generation control apparatus, the target state of charge which is set at the high load state is set when the number of cycles counted by the counting module is equal to or larger than the predetermined number of cycles. When the number of cycles counted by the counting module is equal to or larger than the predetermined number of cycles, it is anticipated that the possibility or frequency at which a high output is required of the electric motor is high. In this way, by holding the target state of charge which is set at the high load state, even in the event that the high output is required of the electric motor over a long period of time, the electric motor can meet the requirement.

In addition, according to the generation control apparatus, the target value is set so as to become high as the number of cycles counted increases. Therefore, the target state of charge is set higher as the number of cycles counted increases. Consequently, even in the event that the high output is required of the electric motor over a long period of time, the electric motor can meet the requirement.

While the invention has been described in detail and by reference to the specific embodiments, it is obvious to those skilled in the art to which the invention pertains that various alterations or modifications can be made thereto without departing from the spirit and scope of the invention.

This patent application is based on Japanese Patent Application (No. 2010-290699) filed on Dec. 27, 2010, the contents of which are to be incorporated herein by reference.

DESCRIPTION OF REFERENCE NUMERALS

101 Battery (BATT)
103 Converter (CONV)
105 First inverter ($1^{st}$ INV)
107 Electric motor (Mot)
109 Internal combustion engine (ENG)
111 Generator (GEN)
113 Second inverter ($2^{nd}$ INV)
115 Gearbox
116 Drive shaft
117 Vehicle speed sensor
119, 219 Management ECU (MG ECU)
121 APU
151 Consumed electric power filtering module
153 P zone determination module
155 Continuation flag setting module
157 APU mode determination module
159 APU operation determination module
161 Generated electric power upper limit setting module
163 Continuation timer
251 Count processing module

The invention claimed is:
1. A generation control apparatus for a hybrid vehicle comprising:

a rechargeable battery which supplies electric power to an electric motor which is a drive source of the hybrid vehicle;

a generation unit having an internal combustion engine and a generator which generates electric power by operation of the internal combustion engine and adapted to supply generated electric power to the electric motor or the battery, wherein:

the generation control apparatus having one generation mode for suppressing a reduction of a state of charge of the battery by controlling the generation unit; and the generation control apparatus activates the generation unit with a high load state in which an electric power that is consumed in the hybrid vehicle over a predetermined period of time becomes larger than a maximum output electric power of the generation unit, while controlling the generation unit to operate in the one generation mode unless the battery reaches a target state of charge of the battery and continues to drive the generation unit until the state of charge of the battery reaches the target state of charge of the battery which is set at the high load state, when the electric power that is consumed in the hybrid vehicle over the predetermined period of time becomes smaller than the maximum output electric power of the generation unit; and a processor configured to count the number of cycles in which the battery is charged to the target state of charge in the high load state by generated electric power from the generation unit, and characterized in that when the number of cycles counted by the processor is equal to or larger than a predetermined number of cycles, the target state of charge which is set at the high load state is set as the target state of charge of the battery.

2. The generation control apparatus as set forth in claim 1, wherein:

the generation control apparatus has another generation mode for holding the state of charge of the battery; and the generation control apparatus controls the operation of the generation unit based on the another generation mode after the battery has reached the target state of charge.

3. The generation control apparatus as set forth in claim 1, wherein when the operation of the generation unit is controlled based on the one generation mode, the generation unit is activated before the battery reaches the target state of charge.

4. A generation control apparatus as set forth in claim 1, wherein the consumed electric power over the predetermined period of time is an average or accumulated electric power that is consumed in the hybrid vehicle over the predetermined period of time.

5. A generation control apparatus for a hybrid vehicle comprising:

a rechargeable battery which supplies electric power to an electric motor which is a drive source of the hybrid vehicle; and a generation unit having an internal combustion engine and a generator which generates electric power by operation of the internal combustion engine and adapted to supply generated electric power to the electric motor or the battery;

a processor configured to determine whether or not an electric power that is consumed in the hybrid vehicle over a predetermined period of time belongs to a high load zone which is equal to or larger than a threshold;

the processor configured to count a time that has elapsed from a point in time when a consumed electric power over the predetermined period of time departed from the high load zone;

the processor configured to set different target states of charge for the battery according to the result of the determination of whether or not the consumed electric power over the predetermined period of time belongs to the high load zone;

the processor configured to set a continuation flag to indicate that the determination continues to be held that the consumed electric power over the predetermined period of time belongs to the high load zone in the event that the battery has not yet reached a target state of charge even after the consumed electric power over the predetermined period of time has departed from the high load zone and the processor has finished counting the predetermined period of time; and the processor configured to control the operation of the generation unit so that the battery reaches the target state of charge by charging the battery using electric power from the generation unit, wherein:

the generation control apparatus has one generation mode for suppressing a reduction of the state of charge of the battery by controlling the generation unit;

when the continuation flag indicates that the determination continues to be held that the consumed electric power over the predetermined period of time belongs to the high load zone, the processor holds the state of the continuation flag until the state of charge of the battery reaches the target state of charge which is set by the processor when the processor determines that the consumed electric power over the predetermined period of time belongs to the high load zone; and the generation control apparatus controls the operation of the generation unit based on the one generation mode in the event that the battery has not yet reached the target state of charge when the processor determines that the consumed electric power over the predetermined period of time belongs to the high load zone.

6. The generation control apparatus as set forth in claim 5, wherein the generation control apparatus has another generation mode for holding the state of charge of the battery, and controls the operation of the generation unit based on the another generation mode after the battery has reached the target state of charge.

7. The generation control apparatus as set forth in claim 5, comprising:

the processor configured to count the number of cycles in which the battery is charged to the target state of charge, in the high load state by generated electric power from the generation unit, and characterized in that when the number of cycles counted by the processor is equal to or larger than a predetermined number of cycles, the target state of charge which is set at the high load state is set as the target state of charge of the battery.

8. The generation control apparatus as set forth in claim 5, wherein the consumed electric power over the predetermined period of time which results when it is determined to belong to the high load zone by the processor is larger than the maximum output electric power of the generation unit.

9. The generation control apparatus as set forth in claim 5, wherein the processor calculates a target value, which corresponds to the consumed electric power over the predetermined period of time, by making use of a table or a calculation expression in relation to the target state of charge, in which different target values are set according to electric power, and sets a previous target value as the target state of charge when the target value, which is lower than the previous target value, is calculated as the target state of charge while the processor determines that the consumed electric power over the predetermined period of time belongs to the high load zone.

10. The generation control apparatus as set forth in claim 9, comprising:
the processor configured to count the number of cycles in which the battery is charged to the target state of charge which is set when it is determined that the consumed electric power over the predetermined period of time belongs to the high load zone by generated electric power from the generation unit, wherein
the target value which differs according to the electric power is set such that it becomes high as the number of cycles increases in the table or the calculation expression in relation to the target state of charge, and in that
when the number of cycles counted by the processor is equal to or larger than a predetermined number of cycles, the processor sets the target state of charge which results when it is determined that the consumed electric power over the predetermined period of time belongs to the high load zone.

11. The generation control apparatus as set forth in claim 5, comprising:
the processor configured to count the number of cycles in which the battery is charged to the target state of charge, wherein the target state of charge is set when it is determined that the consumed electric power over the predetermined period of time belongs to the high load zone by generated electric power from the generation unit, wherein
when the number of cycles counted by the processor is equal to or larger than a predetermined number of cycles, the processor sets the target state of charge which results when it is determined that the consumed electric power over the predetermined period of time belongs to the high load zone.

12. A generation control method for a hybrid vehicle comprising:
a rechargeable battery for supplying electric power to an electric motor which is a drive source of the hybrid vehicle, and a generation unit having an internal combustion engine and a generator which generates electric power by operation of the internal combustion engine and adapted to supply generated electric power to the electric motor or the battery, the method comprising:
activating the generation unit with a high load state in which an electric power that is consumed in the hybrid vehicle over a predetermined period of time becomes larger than a maximum output electric power of the generation unit and thereafter, driving continuously the generation unit until a state of charge of the battery reaches a target state of charge of the battery which is set at the high load state;
controlling the operation of the generation unit based on one generation mode for suppressing the reduction of the state of charge of the battery in the event that the battery has not yet reached the target state of charge and controlling the operation of the generation unit based on another generation mode for holding the state of charge of the battery after the battery has reached the target state of charge; and
counting the number of cycles in which the battery is charged to the target state of charge in the high load state by generated electric power from the generation unit, and characterized in that
when the number of cycles counted by the counting is equal to or larger than a predetermined number of cycles, the target state of charge which is set at the high load state is set as the target state of charge of the battery.

13. A generation control method for a hybrid vehicle comprising a rechargeable battery for supplying electric power to an electric motor which is a drive source of the hybrid vehicle, and a generation unit having an internal combustion engine and a generator which generates electric power by operation of the internal combustion engine and adapted to supply generated electric power to the electric motor or the battery, the method comprising:
determining whether or not an electric power that is consumed in the hybrid vehicle over a predetermined period of time belongs to a high load zone which is equal to or larger than a threshold;
setting different target states of charge for the battery according to the result of the determination of whether or not a consumed electric power over the predetermined period of time belongs to the high load zone;
controlling the operation of the generation unit so that the battery reaches a target state of charge by charging the battery using electric power from the generation unit;
counting a time that has elapsed from a point in time when the consumed electric power over the predetermined period of time departed from the high load zone;
setting a continuation flag to indicate that the determination continues to be held that the consumed electric power over the predetermined period of time belongs to the high load zone in the event that the battery has not yet reached the target state of charge even after the consumed electric power over the predetermined period of time has departed from the high load zone and the counting of the predetermined period of time has been finished;
when the continuation flag indicates that the determination continues to be held that the consumed electric power over the predetermined period of time belongs to the high load zone, holding the state of the continuation flag until the state of charge of the battery reaches the target state of charge which is set when it is determined that the consumed electric power over the predetermined period of time belongs to the high load zone; and
when it is determined that the consumed electric power over the predetermined period of time belongs to the high load zone, controlling the operation of the generation unit based on one generation mode for suppressing a reduction of the state of charge of the battery in the event that the battery has not yet reached the target state of charge, and controlling the operation of the generation unit based on another generation mode for holding the state of charge of the battery after the battery has reached the target state of charge.

* * * * *